United States Patent
Küch et al.

(10) Patent No.: US 10,838,687 B2
(45) Date of Patent: *Nov. 17, 2020

(54) LOUDNESS CONTROL FOR USER INTERACTIVITY IN AUDIO CODING SYSTEMS

(71) Applicant: Fraunhofer-Gesellschaft zur Förderung der angewandten Forschung e.V., Munich (DE)

(72) Inventors: Fabian Küch, Erlangen (DE); Christian Uhle, Ursensollen (DE); Michael Kratschmer, Möhrendorf (DE); Bernhard Neugebauer, Buckenhof (DE); Michael Meier, Aurachtal (DE)

(73) Assignee: Fraunhofer-Gesellschaft zur Förderung der angewandten Forschung e.V. (DE)

( * ) Notice: Subject to any disclaimer, the term of this patent is extended or adjusted under 35 U.S.C. 154(b) by 0 days.

This patent is subject to a terminal disclaimer.

(21) Appl. No.: 16/413,507

(22) Filed: May 15, 2019

(65) Prior Publication Data

US 2019/0265944 A1    Aug. 29, 2019

Related U.S. Application Data

(63) Continuation of application No. 15/842,682, filed on Dec. 14, 2017, now Pat. No. 10,394,520, which is a (Continued)

(30) Foreign Application Priority Data

Jun. 17, 2015    (EP) .................................... 15172593

(51) Int. Cl.
*G06F 17/10*    (2006.01)
*G10L 19/008*    (2013.01)
(Continued)

(52) U.S. Cl.
CPC .............. *G06F 3/165* (2013.01); *G06F 3/162* (2013.01); *G06F 17/10* (2013.01); *H04S 3/008* (2013.01);
(Continued)

(58) Field of Classification Search
CPC . C12Q 1/6895; C12Q 2600/158; G06F 17/10; G06F 3/162; G06F 3/165;
(Continued)

(56) References Cited

U.S. PATENT DOCUMENTS

2009/0222118 A1    9/2009 Oh et al.
2009/0304198 A1    12/2009 Herre et al.
(Continued)

FOREIGN PATENT DOCUMENTS

CN    101123830 A    2/2008
CN    103354630 A    10/2013
(Continued)

OTHER PUBLICATIONS

Office Action dated Sep. 20, 2018 issued in parallel Russian patent application No. 2018101440 (13 pages).
(Continued)

*Primary Examiner* — Paul Kim
*Assistant Examiner* — Friedrich Fahnert
(74) *Attorney, Agent, or Firm* — Haynes and Boone, LLP

(57) ABSTRACT

An audio processor for processing an audio signal includes: an audio signal modifier for modifying the audio signal in response to a user input; a loudness controller for determining a loudness compensation gain based on a reference loudness or a reference gain and a modified loudness or a modified gain, where the modified loudness or the modified gain depends on the user input; and a loudness manipulator for manipulating a loudness of a signal using the loudness compensation gain.

25 Claims, 2 Drawing Sheets

Related U.S. Application Data continuation of application No. PCT/EP2016/063205, filed on Jun. 9, 2016.

(51) Int. Cl.
*G06F 3/16* (2006.01)
*H04S 7/00* (2006.01)
*H04S 3/00* (2006.01)

(52) U.S. Cl.
CPC .............. *H04S 7/30* (2013.01); *G10L 19/008* (2013.01); *H04S 2400/13* (2013.01); *H04S 2420/11* (2013.01)

(58) Field of Classification Search
CPC ............... G10L 19/008; H04S 2400/13; H04S 2420/11; H04S 3/008; H04S 7/30
USPC ....... 381/22, 28, 56, 66, 103, 104, 106, 107, 381/303, 307; 704/99, 500
See application file for complete search history.

(56) References Cited

U.S. PATENT DOCUMENTS

| | | | |
|---|---|---|---|
| 2010/0076577 A1 | 3/2010 | Lee et al. | |
| 2010/0106270 A1 | 4/2010 | Oh et al. | |
| 2010/0189266 A1 | 7/2010 | Oh et al. | |
| 2011/0085025 A1* | 4/2011 | Pace | H04N 13/178 348/49 |
| 2012/0057715 A1 | 3/2012 | Johnston et al. | |
| 2012/0230497 A1 | 9/2012 | Dressler et al. | |
| 2014/0039890 A1* | 2/2014 | Mundt | G10L 19/167 704/236 |
| 2014/0064503 A1 | 3/2014 | Ko et al. | |
| 2014/0072126 A1 | 3/2014 | Uhle et al. | |
| 2014/0294200 A1 | 10/2014 | Baumgarte et al. | |
| 2015/0036842 A1 | 2/2015 | Robinson | |
| 2015/0245153 A1 | 8/2015 | Malak et al. | |
| 2015/0325243 A1* | 11/2015 | Grant | H03G 9/005 704/229 |
| 2015/0348564 A1 | 12/2015 | Paulus et al. | |
| 2016/0196830 A1* | 7/2016 | Riedmiller | G10L 19/167 704/500 |
| 2016/0248393 A1 | 8/2016 | Seefeldt | |
| 2016/0337776 A1 | 11/2016 | Breebaart et al. | |
| 2017/0013387 A1* | 1/2017 | Fersch | G10L 19/008 |

FOREIGN PATENT DOCUMENTS

| | | |
|---|---|---|
| EP | 2083585 A1 | 7/2009 |
| EP | 2879131 A | 6/2015 |
| RU | 2347282 C2 | 2/2009 |
| TW | 201438003 A | 10/2014 |
| WO | WO 2008/100119 A1 | 8/2008 |
| WO | WO 2008/111770 A1 | 9/2008 |
| WO | WO 2013/006338 A2 | 1/2013 |
| WO | WO 2014/114781 A1 | 7/2014 |
| WO | WO 2014/165326 A1 | 10/2014 |
| WO | WO 2015/038522 A1 | 3/2015 |

OTHER PUBLICATIONS

Office Action dated Feb. 2, 2019 issued in parallel Chinese patent application No. 201680034882.0 (20 pages).

Simone Füg et al; "Object Interaction Use Cases and Technology;" 180 MPEG Meeting No. 33224; Mar. 27, 2014; XP030061676 (20 pages).

Simone Füg et al; "Design, Coding and Processing of Metadata for Object-based Interactive Audio;" AES Convention 137; Oct. 8, 2014; XP 040639006 (12 pages).

J. Herre et al., "MPEG-H Audio—The new Standard for Universal Spatial / 3D Audio Coding," $137^{th}$ AES Convention, 2014, Los Angeles (12 pages).

Recommendation ITU-R BS. 1770-3, "Algorithms to measure audio programme loudness and true-peak audio level," Geneva, Aug. 2012 (24 page).

Office Action issued in related Taiwan Patent App. No. 105118958 dated Feb. 2, 2017 (8 pages).

ATSC Recommended Practice: Techniques for Establishing and Maintaining Audio Loudness for Digital Television (A/85:2013), Mar. 12, 2013, Advanced Television Systems Committee, Washington, D.C. (72 pages).

"R128—Loudness Normalisation and Permitted Maximum Level of Audio Signals," EBU Operating Eurovision and Euroradio, Jun. 2014, Geneva (5 pages).

International Search Report dated Nov. 14, 2016, issued in PCT App. No. PCT/EP2016/063205 (8 pages).

Office Action (Decision to Grant) dated Aug. 6, 2019 issued in the parallel Japanese patent application No. 2017-565686.

Notice of Allowance dated Mar. 11, 2020 issued in the parallel Korean patent application No. 10-2018-7001349 (9 pages).

ISO/IEC DIS 23008-3. Information technology—High efficiency coding and media delivery in heterogeneous environments—Part 3: 3D audio. ISO/IEC JTC 1/SC 29/WG 11. Jul. 25, 2014.

Notice of Allowance dated May 29, 2020 issued in the parallel Chinese patent application No. 201680034882.0 (6 pages).

Office Action dated Aug. 4, 2020 issued in the parallel Malaysian patent application No. PI2017001875 (4 pages).

* cited by examiner

LOUDNESS CONTROL FOR USER INTERACTIVITY IN AUDIO CODING SYSTEMS

CROSS-REFERENCES TO RELATED APPLICATIONS

This application is a continuation of co-pending U.S. patent application Ser. No. 15/842,682 filed Dec. 14, 2017 and International Application No. PCT/EP2016/063205, filed Jun. 9, 2016, which is incorporated herein by reference in its entirety, and additionally claims priority from European Application No. EP 15172593.4, filed Jun. 17, 2015, which is incorporated herein by reference in its entirety.

The invention refers to an audio processor and to an audio encoder. The invention also refers to corresponding methods.

BACKGROUND OF THE INVENTION

Modern audio coding systems do not only provide means to efficiently transmit audio content in a loudspeaker channel-based representation that is simply played back at the decoder side. They additionally include more advanced features to allow users to interact with the content and, thus, to influence how the audio is reproduced and rendered at the decoder. This allows for new types of user experiences compared to legacy audio coding systems.

An example for an advanced audio coding systems is the MPEG-H 3D Audio standard (J. Herre at al., "MPEG-H Audio—The New Standard for Universal Spatial/3D Audio Coding", 137th AES Convention, 2014, Los Angeles). It allows a transmission of immersive audio content in three different formats, channel-based, object-based, and scene-based using higher order ambisonics (HOA). It has been designed to offer new capabilities such as user interaction for personalization and adaptation of the audio for different use scenarios.

The three different categories for content formats can be described as follows:
- Channel-based: Traditionally, spatial audio content (starting from simple two channel stereo) has been delivered as a set of channel signals which are designated to be reproduced by loudspeakers in a precisely defined, fixed target location relative to the listener.
- Object-based: Audio objects are signals that are to be reproduced as to originate from a specific target location that is specified by associated side information provided as metadata along with the audio. In contrast to channel signals, the actual placement of audio objects can vary over time and is not necessarily pre-defined during the sound production process but by rendering it to the target loudspeaker setup at the time of reproduction. This may also include user interactivity on the location or the level of an object or groups of objects.
- Higher Order Ambisonics (HOA) is an alternative approach to capture a 3D sound field by transmitting a number of 'coefficient signals' that have no direct relationship to channels or objects. The actual audio signals for reproduction are generated at the decoder taking into account the given loudspeaker configuration.

A method for loudness compensation in object-based audio coding systems including user interaction has been presented in EP 2 879 131 A1. A decoder receives an audio input signal comprising audio object signals and generates an audio output signal. A signal processor determines a loudness compensation value for the audio output signal based on loudness information associated with the audio input signal and based on rendering information. The rendering information indicates whether one or more of the audio object signals shall be amplified or attenuated and can be adjusted by a user's wish.

SUMMARY

According to an embodiment, an audio processor for processing an audio signal may have: an audio signal modifier, wherein the audio signal modifier is configured to modify the audio signal in response to a user input; a loudness controller, wherein the loudness controller is configured to determine a loudness compensation gain based on the one hand on a reference loudness or a reference gain and on the other hand on a modified loudness or a modified gain, wherein the modified loudness or the modified gain depends on the user input, wherein the loudness controller is configured to determine the loudness compensation gain based on metadata of the audio signal indicating which group is to be used or is not to be used for determining the loudness compensation gain, and wherein the group includes one or more audio elements; and a loudness manipulator, wherein the loudness manipulator is configured to manipulate a loudness of a signal using the loudness compensation gain.

According to another embodiment, an audio processor for processing an audio signal may have: an audio signal modifier, wherein the audio signal modifier is configured to modify the audio signal in response to a user input; a loudness controller, wherein the loudness controller is configured to determine a loudness compensation gain based on the one hand on a reference loudness or a reference gain and on the other hand on a modified loudness or a modified gain, wherein the modified loudness or the modified gain depends on the user input, wherein the loudness controller is configured to determine the loudness compensation gain based on metadata of the audio signal referring to at least one preset, wherein the preset refers to a set of at least one group including one or more audio elements; and a loudness manipulator, wherein the loudness manipulator is configured to manipulate a loudness of a signal using the loudness compensation gain.

According to another embodiment, an audio processor for processing an audio signal may have: an audio signal modifier, wherein the audio signal modifier is configured to modify the audio signal in response to a user input; a loudness controller, wherein the loudness controller is configured to determine a loudness compensation gain based on the one hand on a reference loudness or a reference gain and on the other hand on a modified loudness or a modified gain, wherein the modified loudness or the modified gain depends on the user input, wherein the loudness controller is configured to determine the loudness compensation gain based on metadata of the audio signal indicating whether a group is switched off or switched on, wherein the group includes one or more audio elements; and a loudness manipulator, wherein the loudness manipulator is configured to manipulate a loudness of a signal using the loudness compensation gain.

According to another embodiment, an audio processor for processing an audio signal may have: an audio signal modifier, wherein the audio signal modifier is configured to modify the audio signal in response to a user input; a loudness controller, wherein the loudness controller is configured to determine a loudness compensation gain based on the one hand on a reference loudness or a reference gain and on the other hand on a modified loudness or a modified gain, wherein the modified loudness or the modified gain depends on the user input, wherein the loudness controller is configured to determine the loudness compensation gain based on metadata of the audio signal with at least one group loudness missing in the metadata of a group included in the audio signal; and a loudness manipulator, wherein the loudness manipulator is configured to manipulate a loudness of a signal using the loudness compensation gain.

According to another embodiment, an audio processor for processing an audio signal may have: an audio signal modifier, wherein the audio signal modifier is configured to modify the audio signal in response to a user input; a loudness controller, wherein the loudness controller is configured to determine a loudness compensation gain based on the one hand on a reference loudness or a reference gain and on the other hand on a modified loudness or a modified gain, wherein the modified loudness or the modified gain depends on the user input, wherein the loudness controller is configured to determine the loudness compensation gain based on metadata of the audio signal referring to a playback configuration for a reproduction of the signal; and a loudness manipulator, wherein the loudness manipulator is configured to manipulate a loudness of a signal using the loudness compensation gain.

According to another embodiment, an audio encoder for generating an audio signal including metadata may have: a loudness determiner for determining a loudness value for at least one group having one or more audio elements; and a metadata writer for introducing the determined loudness value as a group loudness into the metadata.

According to another embodiment, a method for processing an audio signal may have the steps of: modifying the audio signal in response to a user input; determining a loudness compensation gain based on the one hand on a reference loudness or a reference gain and on the other hand on a modified loudness or a modified gain, where the modified loudness or the modified gain depends on the user input, wherein the loudness compensation gain is determined based on metadata of the audio signal indicating whether a group included in the audio signal is to be used or is not to be used for determining the loudness compensation gain, wherein the group includes one or more audio elements, and/or wherein the loudness compensation gain is determined based on metadata of the audio signal referring to a preset, wherein the preset refers to a set of at least one group including one or more audio elements, and/or wherein the loudness compensation gain is determined based on metadata of the audio signal indicating whether a group is switched off or switched on, wherein the group includes one or more audio elements, and/or wherein the loudness compensation gain is determined based on metadata of the audio signal with at least one group loudness missing in the metadata of a group included in the audio signal, and/or wherein the loudness compensation gain is determined based on metadata of the audio signal referring to a playback configuration for a reproduction of the signal; and manipulating a loudness of a signal using the loudness compensation gain.

According to another embodiment, a method for generating an audio signal including metadata may have the steps of: determining a loudness value for a group having one or more audio elements; and introducing the determined loudness value for the group as a group loudness into the metadata.

According to another embodiment, a non-transitory digital storage medium may have a computer program stored thereon to perform any of the inventive methods, when said computer program is run by a computer.

An advantage is achieved by an audio processor for processing an audio signal, comprising: an audio signal modifier, wherein the audio signal modifier is configured to modify the audio signal in response to a user input; a loudness controller, wherein the loudness controller is configured to determine a loudness compensation gain based on the one hand on a reference loudness or a reference gain and on the other hand on a modified loudness or a modified gain, wherein the modified loudness or the modified gain depends on the user input, wherein the loudness controller is configured to determine the loudness compensation gain based on metadata of the audio signal indicating which group is to be used or is not to be used for determining the loudness compensation gain, and wherein the group comprises one or more audio elements; and a loudness manipulator, wherein the loudness manipulator is configured to manipulate a loudness of a signal using the loudness compensation gain.

The audio processor—or decoder or apparatus for processing an audio signal—receives an audio signal and generates in one embodiment an output signal which comprises the audio objects and audio elements etc. of the audio signal to be reproduced, for example, by loudspeakers or earphones or to be stored at a medium and so on.

The audio processor reacts to a user input via an audio signal modifier that is configured to modify the audio signal in response to a user input. The user input refers in one embodiment to an amplification or an attenuation of a group and/or to switching off a group or to switching on a group. The groups comprise one or more audio elements, e.g. audio objects, channels, objects or HOA components. The user input also refers, depending on the embodiment, to data concerning the playback configuration used for the reproduction of the signal. A further user input refers to a selection of a preset. A preset refers to a set of at least one group and specifies—depending on the embodiment—specifically measured group loudness values and/or gain values for the respective groups. The user input is used by the audio signal modifier for modifying appropriately the audio signal. In one embodiment, the metadata comprises data belonging to a plurality of presets.

The preset refers in an embodiment to a set a group and defines in a different embodiment the groups that do not belong to the preset.

The audio processor also comprises a loudness controller that is configured to determine a loudness compensation gain. The loudness compensation gain—here called C—allows to counterbalance the effect of the user input in order to provide a signal with an overall loudness as may be useful or as set by the user. The loudness compensation gain is determined based on the one hand on a reference loudness or a reference gain and on the other hand on a modified loudness or a modified gain. Thus, the loudness compensation gain is determined based on a reference loudness or a reference gain and a modified loudness or a modified gain. The modified loudness or the modified gain are depending on the user input.

The loudness controller is additionally configured to determine the loudness compensation gain based on metadata of the audio signal. The metadata that is associated with the audio signal carries information about the audio signal and the individual groups and is in one embodiment compromised by the audio signal itself.

The data of the metadata—of the here discussed embodiment of the audio processor—is indicating whether a group—especially comprised by the audio signal—is to be used—e.g. is to be considered—or is not to be used—e.g. is to be neglected—for determining the loudness compensation gain. Hence, the information about the corresponding groups is either considered or neglected for determining the loudness compensation gain. In at least one embodiment, whether a group or groups is/are considered or neglected, depends additionally on the user input.

In one embodiment, considering or neglecting groups includes also considering or neglecting them partially in the sense, that the groups and their respective values are only used for a part of the determination of the loudness compensation gain, e.g. only for the calculation of the reference or the modified loudness.

The loudness compensation gain is used by a loudness manipulator comprised by the audio processor. The loudness manipulator manipulates a loudness of a signal using the loudness compensation gain. The applied loudness compensation gain is not only affected by the user input but is also the result of the data of the metadata associated with or even belonging to the audio signal.

The signal manipulated by the loudness manipulator is according to an embodiment an output signal provided by the audio processor and based on the audio signal. The loudness manipulator in this embodiment provides the output signals and manipulates the loudness of the output signal using the loudness compensation gain.

In a different embodiment, the loudness manipulator manipulates a loudness of a signal provided to the loudness manipulator and advantageously already modified according to the user input. In this embodiment, a part of the audio processor provides or generates a signal that is fed to the loudness manipulator and is accordingly processed, i.e. modified with regard to its loudness by the loudness manipulator.

In a further embodiment, the signal whose loudness is manipulated by the loudness manipulator is the audio signal. In this case, the loudness manipulator modifies the metadata of the audio signal by the modification. This embodiment is associated with a further embodiment, in which the audio processor provides a modified audio signal. The modified audio signal is modified according to the user input and according to the modification of the loudness. This modified audio signal is afterwards also a bitstream.

According to an embodiment of the audio processor, the loudness controller is configured to determine the loudness compensation gain based on at least one flag comprised by the data of the metadata, wherein the flag is indicating whether or how a group is to be considered for determining the loudness compensation gain. In this embodiment, the metadata comprises flags having, for example, either a "true" or "false" value indicating whether an associated group has to be considered for calculating the loudness compensation gain or not, respectively. The consideration of a group refers in one embodiment also to the question for which step of the calculation the group is to be used for. This refers e.g. to the calculation of the reference loudness and the modified loudness. The reference loudness and the modified loudness are the calculated overall loudnesses before and after the consideration of the user input, respectively. The flag indicates in a different embodiment that the corresponding group is present just during a short interval and, thus, can be neglected for determining the loudness compensation gain.

According to an embodiment of the audio processor, the loudness controller is configured to use only groups for determining the loudness compensation gain when the groups belong to an anchor comprised by the metadata of the audio signal. The anchor refers in one embodiment, for example, to audio elements belonging to voices, dialogs or special sound effects.

The handling of groups belonging to an anchor is further elaborated in the following embodiments.

In one embodiment, the loudness controller is configured to use only the groups belonging to the anchor for determining the loudness compensation gain when the modified gain of at least one group belonging to the anchor is greater than the corresponding reference gain. Thus, just the groups of the anchor are used for the calculation of the loudness compensation gain when the gain value of at least one group of these "anchor groups" is increased due to the user input, i.e. when the user amplified at least one of these groups.

In an alternative or supplemental embodiment, the loudness controller is configured to use groups belonging to the anchor and groups missing from the anchor for determining the loudness compensation gain when the modified gain of at least one group belonging to the anchor is lower than the corresponding reference gain. Thus, in this embodiment, not only groups belonging to the anchor but also groups that do not belong to the anchor are used for the calculation, when the gain value of at least one anchor group is lowered due to the user input.

In one embodiment, the two foregoing embodiments are combined. Thus, the change of the gain of at least one group belonging to the anchor determines whether only anchor groups or anchor groups and non-anchor groups are used for determining the loudness compensation gain.

An advantage is also achieved by an audio processor for processing an audio signal, comprising: an audio signal modifier, wherein the audio signal modifier is configured to modify the audio signal in response to a user input; a loudness controller, wherein the loudness controller is configured to determine a loudness compensation gain based on the one hand on a reference loudness or a reference gain and on the other hand on a modified loudness or a modified gain, wherein the modified loudness or the modified gain depends on the user input, wherein the loudness controller is configured to determine the loudness compensation gain based on metadata of the audio signal referring to at least one preset, wherein the preset refers to a set of at least one group comprising one or more audio elements; and a loudness manipulator, wherein the loudness manipulator is configured to manipulate a loudness of a signal using the loudness compensation gain.

For the general description of the audio processor see the discussion above.

The loudness controller of the audio processor refers to data of the metadata associated with or belonging to the audio signal. The data refers to a preset, wherein the preset refers to a set of at least one group comprising one or more audio elements. In this embodiment, it is taken care of the case that combinations of groups are associated with specific loudness and/or gain values for a specific preset. Hence, the metadata comprises data for the groups depending on different presets or at least on a default preset. Therefore, the loudness controller uses the data which is associated with a preset chosen by the user or which is a default preset.

The audio processor is in one embodiment configured according to at least one of the foregoing embodiments.

Hence, the embodiments discussed above are at least partially also realized with the audio processor mentioned before.

According to an embodiment of the audio processor, the loudness controller is configured to determine the loudness compensation gain based on group loudnesses and/or gain values of the at least one group of the set referred to by the preset. The preset refers to a specific set of groups of audio elements comprised by the audio signal. For these groups, the metadata contains specific data—i.e. group loudnesses and/or gain values—to be used for the determination of the loudness compensation gain when the corresponding preset is chosen or set as a default preset.

In a further embodiment, the loudness controller is configured to determine the reference loudness for the set referred to by the preset using the respective group loudnesses and the respective gain values. The loudness controller is also configured to determine the modified loudness for the set referred to by the preset using the respective group loudnesses and the respective modified gain values. The modified gain values are modified by the user input. In this embodiment, the reference loudness and the modified loudness are determined based on the values associated with a preset and for the groups belonging to the preset. The determination takes also care of the indication whether and how—e.g. for the determination of reference or modified loudness—the groups are to be used.

In a further embodiment, the loudness controller is configured to determine the loudness compensation gain based on data comprised by the metadata of the audio signal referring to a selected preset and wherein the preset is selected by the user input. In this embodiment, the preset is chosen by the user via the user input.

According to an embodiment of the audio processor, the loudness controller is configured to determine the loudness compensation gain based on data comprised by the metadata of the audio signal referring to a default preset. The default preset is set prior to or independently of a user input. This embodiment handles the situation that a user does not chose a preset. For this, a default preset is used, e.g. prior to any user input for ensuring that even without an interaction by the user a set of data—here covering a default preset—is used for determining the loudness compensation gain.

An advantage is also achieved by an audio processor for processing an audio signal, comprising: an audio signal modifier, wherein the audio signal modifier is configured to modify the audio signal in response to a user input; a loudness controller, wherein the loudness controller is configured to determine a loudness compensation gain based on the one hand on a reference loudness or a reference gain and on the other hand on a modified loudness or a modified gain, wherein the modified loudness or the modified gain depends on the user input, wherein the loudness controller is configured to determine the loudness compensation gain based on metadata of the audio signal indicating whether a group is switched off or switched on, wherein the group comprises one or more audio elements; and a loudness manipulator, wherein the loudness manipulator is configured to manipulate a loudness of a signal using the loudness compensation gain.

For the general description of the audio processor of this embodiment see the discussion above.

The loudness controller here is configured to determine the loudness compensation gain based on metadata of the audio signal indicating whether a group is switched off or switched on. In an example, the audio signal may comprise as audio objects different soundtracks belonging to different language versions of a movie. The presets also may refer to different language versions. Hence, in the different presets one soundtrack of one language will be switched on while the other versions will be switched off. This example also shows that the user may switch between the different language versions by switching on a desired and offered language version and, thus, switching off the soundtrack associated with a default preset. Nevertheless, switching on one group does not always imply switching off another group and vice versa.

The audio processor is in one embodiment configured according to at least one of the foregoing embodiments.

The audio processor is in one embodiment configured according to at least one of the foregoing embodiments. Hence, the embodiments discussed above are at least partially also realized with the audio processor mentioned before. This holds also the other way around as one audio processor discussed above is in at least one embodiment realized taking the following embodiments into account.

According to an embodiment, the loudness controller determines the loudness compensation gain based on the user input depending whether a group is switched off or switched on by the user input. Here, the user interaction affects the determination of the loudness controller gain.

According to an embodiment of the audio processor, the loudness controller is configured to discard a group for determining the modified loudness when the group is switched off in response to the user input. If the user switches off a group, in this embodiment, the group is not used for determining the modified loudness which results from the loudness values representing the user's wishes.

In a further embodiment, the loudness controller is configured to discard a group for determining the reference loudness when the group is switched off in the metadata and to include the group for determining the modified loudness when the group is switched on by the user input. In this embodiment, a group is switched off in the metadata and is not used for determining the reference loudness. If the user switches the group on, it is included for the evaluation of the modified loudness.

According to an embodiment of the audio processor, the loudness controller is configured to include a group for determining the reference loudness when the group is switched on in the metadata and to exclude the group for determining the modified loudness when the group is switched off by the user input. In this embodiment, the reverse case of the foregoing embodiment is taken care of.

An advantage is also achieved by an audio processor for processing an audio signal, comprising: an audio signal modifier, wherein the audio signal modifier is configured to modify the audio signal in response to a user input; a loudness controller, wherein the loudness controller is configured to determine a loudness compensation gain based on the one hand on a reference loudness or a reference gain and on the other hand on a modified loudness or a modified gain, wherein the modified loudness or the modified gain depends on the user input, wherein the loudness controller is configured to determine the loudness compensation gain based on metadata of the audio signal with at least one group loudness missing in the metadata of a group comprised by the audio signal; and a loudness manipulator, wherein the loudness manipulator is configured to manipulate a loudness of a signal using the loudness compensation gain.

For the general description of the audio processor of this embodiment see the discussion above.

In this audio processor (or decoder), the loudness controller takes care of the situation that for a group present within the audio signal the corresponding group loudness is missing. The group loudness may either be missing for a specific preset or playback configuration and so one or the metadata may be completely void of any group loudness for this group.

The audio processor is in one embodiment configured according to at least one of the foregoing embodiments. Hence, the embodiments discussed above are at least partially also realized with the audio processor mentioned before. This holds also the other way around as the audio processor discussed above is in at least one embodiment realized taking the following embodiments into account.

According to an embodiment of the audio processor, the loudness controller is configured to calculate the missing group loudness using a loudness of a preset, the reference gain of the group with missing group loudness as well as the group loudnesses and the reference gains for the groups having a group loudness. The loudness of the preset is the overall loudness of the groups of the preset.

In a further embodiment, the loudness controller is configured to determine the loudness compensation gain in the case that the metadata of the audio signal is missing at least one group loudness for a blind loudness compensation using only at least one reference gain and at least one modified gain. In this embodiment, the case of at least one missing group loudness is handled identically to the case that all group loudnesses are missing.

According to an embodiment of the audio processor, the loudness controller is configured to determine the loudness compensation gain in the case that the metadata of the audio signal is void of group loudnesses for a blind loudness compensation using only at least one reference gain and at least one modified gain.

An advantage is also achieved by an audio processor for processing an audio signal, comprising: an audio signal modifier, wherein the audio signal modifier is configured to modify the audio signal in response to a user input; a loudness controller, wherein the loudness controller is configured to determine a loudness compensation gain based on the one hand on a reference loudness or a reference gain and on the other hand on a modified loudness or a modified gain, wherein the modified loudness or the modified gain depends on the user input, wherein the loudness controller is configured to determine the loudness compensation gain based on metadata of the audio signal referring to a playback configuration for a reproduction of the signal; and a loudness manipulator, wherein the loudness manipulator is configured to manipulate a loudness of a signal using the loudness compensation gain.

For the general description of the audio processor of this embodiment see the discussion above.

The audio processor determines the loudness compensation gain based on data referring to a specific playback configuration. The metadata associated with and in one embodiment being comprised by the audio signal, therefore, contains data specified for at least one playback configuration. In one embodiment, for each playback configuration, the metadata contain data corresponding to the respective playback—or reproduction—configuration.

The audio processor is in one embodiment configured according to at least one of the foregoing embodiments. Hence, this audio processor is in one embodiment combined with at least one of the foregoing embodiments.

According to an embodiment of the audio processor, the loudness controller is configured to determine the loudness compensation gain based on the data of the metadata referring to a playback configuration and comprising associated group loudnesses and/or reference gain values. Hence, the different playback configurations are associated with different gain values and/or group loudnesses for the respective groups.

In one embodiment, the metadata comprises data for different presets and different playback configurations.

In a further embodiment, the audio processor comprises a configuration converter for converting data comprised by the metadata and referring to the playback configuration to data referring to a current playback configuration, wherein the loudness controller is configured to determine the loudness compensation gain using data provided by the configuration converter. In this embodiment, the audio processor takes care of the situation that the current playback configuration for reproduction of the signal differs from the playback configurations provided by the metadata. Hence, the data of the metadata are converting in order to fit to the current playback configuration and the converted data are used for the determination of the loudness compensation gain.

In an embodiment, the audio processor comprises a format converter for converting a signal to a predefined playback configuration. In a further embodiment, the loudness controller is configured to select the specific loudness value for the specific playback configuration used by the format converter.

The following embodiments can be realized with any of the foregoing embodiments.

In an embodiment, the audio signal comprises a bitstream with the metadata and the metadata comprises the reference gain for at least one group.

According to an embodiment of the audio processor, the metadata of the audio signal comprises a group loudness for at least one group. In a further embodiment, the metadata comprises group loudnesses for a plurality of groups belonging to the audio signal.

In a further embodiment, the loudness controller is configured to determine the reference loudness for at least one group using the group loudness and the gain value for the—at least one—group, wherein the loudness controller is configured to determine the modified loudness for the—at least one—group using the group loudness and the modified gain value, and wherein the modified gain value is modified by the user input.

In an embodiment, the loudness controller is configured to determine the reference loudness—named $L_{ref}$—for a plurality of groups using the respective group loudnesses—named $L_i$—and gain values—named $g_i$—for the groups. Further, the loudness controller is configured to determine the modified loudness—named $L_{mod}$—for a plurality of groups using the respective group loudness $L_i$ and modified gain values—named $h_i$—for the groups. In one embodiment, the two pluralities of groups are identical and in a different embodiment different. The pluralities also depend on the respective data of the metadata.

In a further embodiment, the loudness controller is configured to perform a limitation operation on the loudness compensation gain so that the loudness compensation gain is lower than an upper threshold and/or so that the loudness compensation gain is greater than a lower threshold.

According to an embodiment of the audio processor, the loudness manipulator is configured to apply a corrected gain to a signal determined by the loudness compensation gain and by a normalization gain determined by a target loudness level set by user input and a metadata loudness level comprised by the metadata of the audio signal. In one embodiment, the normalization gain is determined by using the ratio of the loudness level of the respective groups of the audio signal and the loudness level set by the user to be experienced by the user for the reproduction of the audio signal.

The foregoing embodiments of audio processors allow a loudness compensation following a user input. The loudness compensation is improved by considering data describing groups of the audio signal and their relevance or kind of usage for the loudness compensation. The information about the groups refines the loudness compensation.

The foregoing embodiments refer to an audio processor or to an audio decoder. In the following, an encoder will be discussed providing the audio signal with associated or even comprised metadata to be used by an audio processor.

An advantage is achieved by an audio encoder for generating an audio signal comprising metadata. The audio encoder comprising: a loudness determiner for determining a loudness value for at least one group having one or more audio elements; and a metadata writer for introducing the determined loudness value as a group loudness into the metadata.

According to an embodiment of the audio encoder, the loudness determiner is configured to determine different loudness values and/or different gain values for different playback configurations, wherein the metadata writer is configured to introduce the determined different loudness values and/or different gain values in association with the respective playback configuration into the metadata. In this embodiment, the metadata contains different data for the concerned groups for different playback configurations, thus, improving the playback of the groups of the audio signal.

In an embodiment, the loudness determiner is configured to determine different loudness values and/or different gain values for different presets referring to sets of at least one group comprising one or more audio elements. Further, the metadata writer is configured to introduce the determined different loudness values and/or different gain values in association with the respective preset into the metadata. In this embodiment, the presets refer to specific sets of groups that are associated with specific group loudnesses and/or reference gain values.

In a further embodiment, the audio encoder further comprises a controller, wherein the controller is configured to determine which group is to be used for determining a loudness compensation gain or is to be neglected, and wherein the metadata writer is configured for writing an indication into the metadata indicating which group is to be used or is to be neglected for determining the loudness compensation gain. The indication is in one embodiment a flag. In some embodiments, the indication refers to presets, playback configurations, anchors and/or durations and, hence, relevance of a group.

In at least one embodiment, the metadata contains for at least one group of the audio signal different data (e.g. group loudness or reference gain) with different values.

According to an embodiment of the audio encoder, the audio encoder further comprises an estimator, wherein the estimator is configured to compute a group loudness value for a group, where the group loudness value for the group is undetermined by the loudness determiner. The metadata writer is configured for introducing the computed group loudness value into the metadata so that all groups of the audio signal have associated group loudnesses. In this embodiment, the audio encoder compensates a missing group loudness by computing it based on available data.

An advantage is also achieved by a method for processing an audio signal.

The method comprises at least the following steps:
Modifying the audio signal in response to a user input.
Determining a loudness compensation gain based on the one hand on a reference loudness (as an overall loudness of associated individual groups before a modification by a user) or a reference gain and on the other hand on a modified loudness (as the counterpart of the reference loudness being the combined loudness of the relevant groups after the user input) or a modified gain, where the modified loudness or the modified gain depends on the user input.
The determination of the loudness compensation gain—named C—is performed using at least one or a combination of the following embodiments in which the loudness compensation gain is determined based on data of the metadata associated with—or even comprised by—the audio signal. In the different embodiments, the data are as follows wherein the respective groups comprise one or more audio elements:
The data are indicating whether a group comprised by the audio signal is to be considered or to be neglected for determining the loudness compensation gain.
The data are referring to a preset, wherein the preset refers to a set of at least one group.
The data are indicating whether a group is switched off or switched on.
In the data is at least one group loudness missing of a group comprised by the audio signal.
The data are referring to a playback configuration for a reproduction of the signal.
Manipulating a loudness of an output signal associated with the audio signal using the loudness compensation gain.

An advantage is also achieved by a method for generating an audio signal comprising metadata. The method comprises determining a loudness value for a group having one or more audio elements and introducing the determined loudness value for the group as a group loudness into the metadata.

An advantage is also achieved by a computer program for performing, when running on a computer or a processor, one of the preceding methods.

The embodiments of the apparatus (whether audio processor or audio encoder) can also be performed by steps of the method and corresponding embodiments of the method. Therefore, the explanations given for the embodiments of the apparatus also hold for the method.

BRIEF DESCRIPTION OF THE DRAWINGS

Embodiments of the present invention will be detailed subsequently referring to the appended drawings, in which.

DETAILED DESCRIPTION OF THE INVENTION

Figure 1:
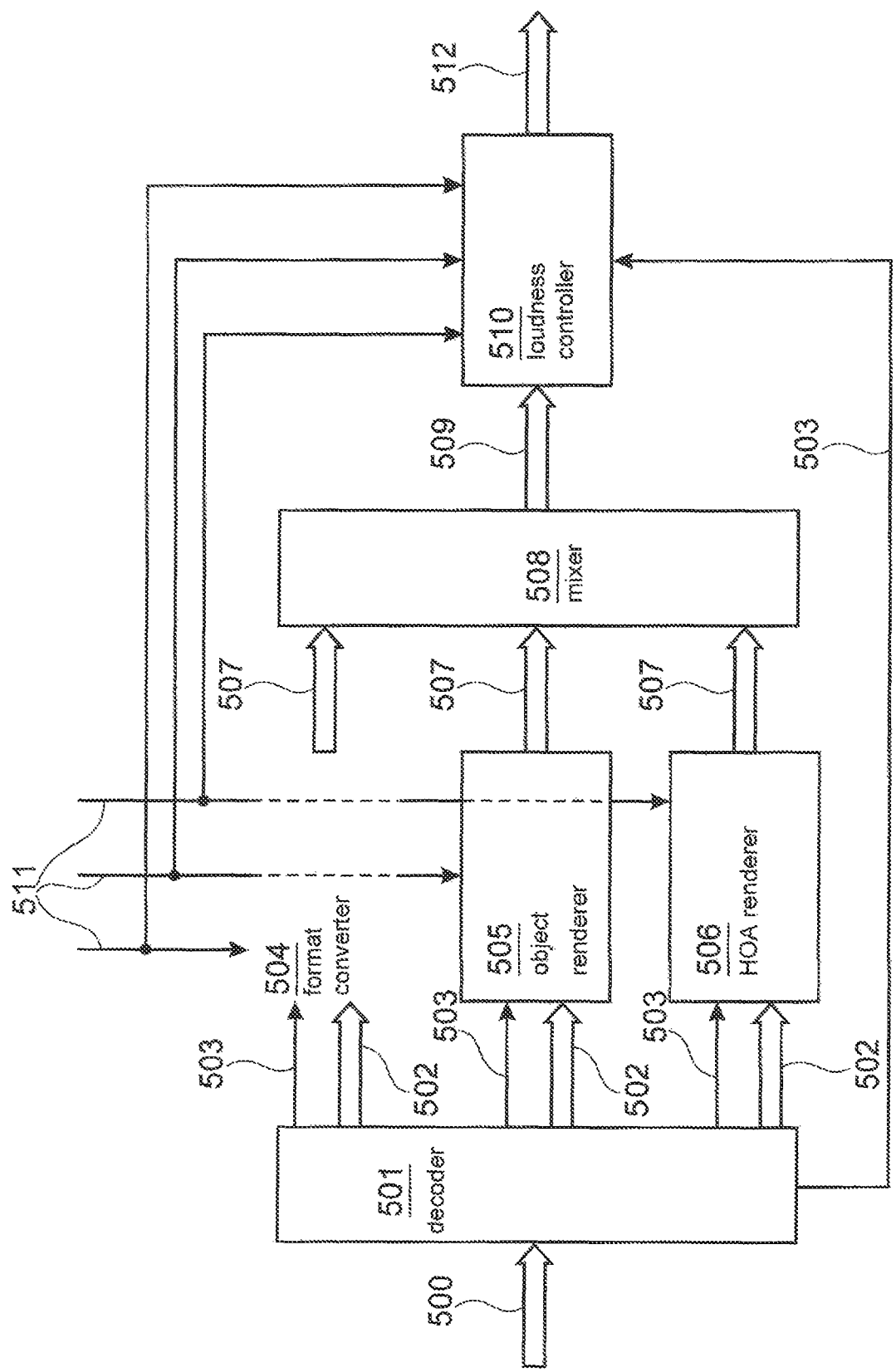
FIG. 1 shows an overview of an audio decoder.

FIG. 1 shows an overview of an MPEG-H 3D Audio decoder as an example for an audio processor, illustrating all major building blocks of the system:
As a first step, the received audio stream 500 (including the transmitted audio signals, be they channels, objects or HOA components, together with associated metadata) is decoded by the decoder 501 providing audio content 502 and associated metadata 503.

Channel signals are mapped to the target reproduction loudspeaker setup using a format converter 504 which serves as a channel renderer and format converter.

Object signals are rendered to the target reproduction loudspeaker setup by the object renderer 505 using the associated object metadata.

Higher Order Ambisonics content is rendered by a HOA renderer 506 to the target reproduction loudspeaker setup using the associated HOA metadata.

The loudspeaker signals corresponding to the different components (channels, object, HOA) in the form of audio signals 507 as outputs of the format converter 504, the object renderer 505, and the HOA renderer 506 are then mixed together in the mixing stage. This is done by a mixer 508 providing a mixed audio signal 509.

The output 509 of the mixer 508 is then processed by the loudness control stage, where the audio is normalized to a desired target loudness level. The loudness controller 510 performs a normalization as well as the loudness compensation. For this purpose, the loudness controller 510 receives user input 511. The user input 511 as a result of a user interaction refers also to information about the loudspeaker configuration to be used for the playback and is also submitted to the format converter 504, the object renderer 505, and to the HOA renderer 506. To the loudness controller 510 metadata 503 is fed especially referring to rendering and/or loudness information extracted by the decoder 501 from the received audio stream 500. The resulting signal 512 is in the shown embodiment submitted to the loudspeakers of the loudspeaker configuration available for the playback.

The possible user interactivity can be divided into e.g. two different categories:

Selection of presets of the transmitted audio program.

Manipulation of the default rendering of groups of audio elements.

The meaning of presets and groups in the context of MPEG-H 3D Audio and of this invention is presented in the following.

The individual channels, objects and HOA scenes available for a transmitted audio program are referred to as audio elements. A group refers to a specific collection of individual audio elements. The specific grouping information of the audio elements is included in the MPEG-H 3D Audio metadata that is transmitted together with the audio content in the audio stream. The elements of a group cannot be interactively changed on their own. Only the entire group can be manipulated, i.e. all included elements together. An example is given by a group that consists of the channels corresponding to a stereo or 5.1 channel loudspeaker configuration. In an extreme case, a group can consist of only a single element, e.g. the dialog object of a program. The user is then able to change e.g. the level of this dialog object within the audio scene.

Presets define a combination of groups in an audio scene. Presets can be used to efficiently signal different presentation of the same audio program within the same audio stream. The preset definition also includes default or initial rendering information of the individual groups, which is used in case the user does not apply any modification. The most important example of this rendering information is the gain that is applied to a group when rendering the entire audio scene. The configuration information that defines a preset is determined at the encoder and it is part of the metadata, e.g. MPEG-H 3D Audio metadata.

It should be noted that the main or default audio scene can be considered as a special type of preset that includes all audio elements without necessarily specifying grouping information. Nevertheless, default or initial rendering information (e.g. gain) for the individual audio elements is typically provided in the metadata also for the main audio scene.

One of the most important features for a next generation audio delivery is advanced loudness control, i.e. proper signaling of loudness information and loudness normalization. Loudness control is especially important in broadcast applications, where it represents an essential feature to fulfill applicable broadcast regulations and recommendations.

The loudness control concept included in MPEG-H 3D Audio is based on metadata representing the measured loudness of the audio program. The metadata is transmitted in the audio stream as an embodiment of the audio signal to be processed by the audio processor together with the actual audio content. At the decoder according to one embodiment, a loudness normalization gain is computed based on the transmitted loudness information and the target loudness level. The loudness normalization gain in one embodiment is then applied to the audio signal after the mixer 508, as illustrated, for example, in FIG. 1.

In order to take into account the specific feature of offering multiple presets of the same audio program with the same audio stream, additional loudness metadata is included, corresponding to the measured loudness of the different presets. Processing steps such as format conversion (downmixing) or dynamic range processing can potentially change the loudness of the audio. Thus, in one embodiment, additional loudness information is included to assure correct loudness normalization also in these cases.

In another embodiment, loudness information of individual groups or even single audio elements is transmitted. The information of group loudness is provided in one embodiment with respect to different loudspeaker configurations. For example, if a group consists of the channel signals, different group loudness information can be included for the case of a reproduction to a stereo or 5.1 loudspeaker configuration. The loudness information of groups will be used for the loudness control in interactive scenarios as proposed in this invention.

The loudness information mentioned above refers to a large variety of configurations for a program (e.g. different presets or different loudspeaker reproduction layouts). Since these configurations are static, one embodiment envisages to measure their loudness at the encoder (or before the encoding process) and populate the corresponding metadata fields in the, for example, MPEG-H 3DA stream.

However, as already mentioned above, an important feature of modern audio coding systems such as MPEG-H 3DA is the support of user interactivity at the decoder: The user can, e.g. adjust the volume of specific groups or even switch them on and off. An important use case is given by dialog enhancement, where the user can manipulate the level of the dialog object, or the group associated with the dialog. In another example, the user increases the level of an immersive sound bed, represented by an HOA-based group. In another example, the user wants to switch on specific groups, e.g. representing video description for the hearing impaired or voice-over tracks.

Changing the level of groups also implies that the overall loudness of the rendered audio scene is changed compared to unmodified case. Thus, consistent playback loudness cannot be assured anymore after gain interactivity. Since the user may change the levels of different objects also more frequently, the loudness level of the audio output can vary over time even for the same program.

It is highly desirable to provide loudness control not only for static presentations of the audio program, but also to take into account user interactivity that changes the loudness of an audio scene. The invention allows to improve loudness control at the decoder in order to enable consistent loudness normalization also in case of user interaction on the levels of groups of audio elements.

The loudness of a program or a preset is preserved when the user changes the level of certain audio elements or groups within the rendered audio scene. A loudness compensation gain is determined in one embodiment based on a reference loudness corresponding to the original audio scene and a modified loudness taking into account gain interactivity of the user. The loudness compensation gain is then applied to the rendered audio signal together with the regular loudness normalization gain to achieve the desired decoder target loudness.

Figure 2:
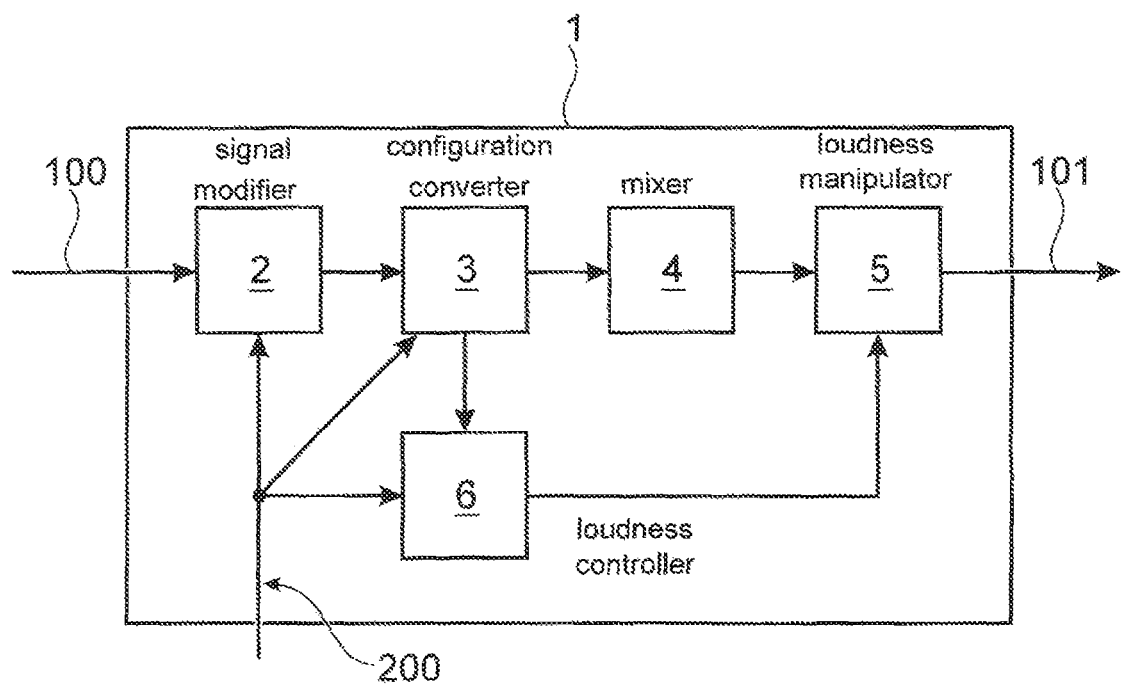
FIG. 2 shows an overview of an audio processor according to the invention and
FIG. 3 shows an overview of an inventive audio encoder.

FIG. 2 shows schematically an example of an audio processor 1—also called decoder or just apparatus for processing an audio signal—1 receiving an audio signal 100 and providing an output signal 101. The output signal 101 in the shown example is an audio signal suitable to be fed to an—not shown—amplifier connected to loudspeakers of the playback situation or to be fed directly to loudspeakers or a headphone. The audio signal 100 comprises a bitstream with the audio signals of individual audio objects and metadata providing information about the audio elements and how to handle them.

The audio signal 100 is submitted to a audio signal modifier 2 which receives user input 200. The user input 200 refers—in the shown example—at least to the selection of a certain preset. Presets refer to specific combinations of groups of audio elements with associated reference gains $g_i$ and/or group loudnesses $L_i$ for the corresponding groups of audio elements. If the user does not chose a preset, a default preset with default values will be used in the shown embodiment.

Further, the user sets via the input 200 the gain values of individual groups. The modified gain values $h_i$ imply that the corresponding group will be amplified or attenuated corresponding to the reference gain values $g_i$ comprised by the metadata. For example, the user might prefer to listen to an amplified background choir and not—as usually—to the leading voice. Hence, the user will raise the gain value of the background choir and decrease the gain value of the lead voice or will switch off this voice.

The user has also the possibility to switch a group off or on. Hence, if the user does not want to hear a group, the group can be switched off. The other way, if the metadata comprises a flag implying that a group is switched off for a specific preset, the user can switch it on. This, for example, can be the case when the audio signal comprises different language versions of a spoken text and the presets refer to the different languages. Hence, switching a group on or off refers to whether the group is used in the playback or not.

To sum up, the signal modifier 2 modifies the audio signal 100 according to the user input 200 via amplifying or attenuation the groups of audio elements belonging to the audio signal 100 and according to the selected or to a default preset covered by the respective data of the metadata.

It follows a configuration converter 3 which converts data to the current playback configuration by which the audio signal 100 is going to be reproduced. Which playback configuration is given and, thus, is the current situation is also covered by the user input 200, e.g. via a selection from a list. For example, the metadata may refer to a surround sound situation whereas the current playback situation allows astereo playback. This conversion refers in one embodiment to the gain values as well as to the loudness values.

The configuration converter 3 submits the converted data to the loudness controller 6 which also receives the user input 200. Based on these data, the loudness controller 6 calculates the loudness compensation gain C which is submitted to the loudness manipulator 5.

The loudness manipulator 5 sets the overall loudness of the output signal 101 by using the loudness compensation gain C and the signal received from the mixer 4. The mixer 4 receives in the shown embodiment via the configuration converter 3 the audio signal 100 after the modification by the audio signal modifier 2 and the conversion by the configuration converter 3 and combines the different groups of audio elements (compare FIG. 1).

For the explanation, in an illustrative example the case is considered where a specific audio scene is defined by a preset, i.e. a specific combination of groups. Each of the groups has an associated initial/default gain defined for the given preset. Additionally, the loudness of each group within the preset is assumed to be available. The preset may be either chosen by the user or set as a default preset. The following notation will be used:

$L_i$ is the loudness of the i-th group of the preset.

$g_i$ is the initial/default gain of the i-th group (given, for example, in dB scale).

$h_i$ is the modified interactivity gain of the i-th group (given e.g. in dB scale)

$M_{ref}$ denotes the set of indexes referring to groups that are included for the computation of the reference loudness of a preset (or the default audio scene).

$M_{mod}$ denotes the set of indexes referring to groups that are included for the computation of the modified loudness of a preset (or the modified audio scene).

In case that a group consists of the collection of channel signals corresponding to a specific loudspeaker configuration or, for example, to an HOA audio scene, multiple group loudness values can be included in the metadata. These different loudness values are associated with different loudspeaker configurations used for playback. For example, if a group represents a channel bed with a 5.1 or 22.2 loudspeaker configuration, a different loudness may be measured for reproducing the group for the original 5.1 or 22.2 loudspeaker configuration compared to the case where the channel bed has to be mapped to a stereo reproduction system using the format converter. In this case, the group loudness associated with stereo reproduction is chosen in one embodiment if available in the transmitted metadata. Otherwise, the group loudness associated with the original loudspeaker configuration is used. An analogous strategy for selecting the appropriate group loudness is proposed in case that a group represents and HOA-based audio scene. In this case the group loudness associated with the present playback loudspeaker configuration should be used (if available in the metadata) instead of the group loudness associated with a reference loudspeaker layout.

In some embodiments, the loudness information is not provided for each group separately, but the same loudness value is referred to by an ensemble of groups.

In general, it is a reasonable to assume that the audio signals in the different groups are uncorrelated. The reference loudness of the preset can then be computed as $$L_{ref} = 10 \log_{10} \sum_{i \in M_{ref}} 10^{\frac{g_i}{10}} 10^{\frac{L_i}{10}}$$

Analogously, the loudness of the modified audio scene is computed as $$L_{mod} = 10 \log_{10} \sum_{i \in M_{mod}} 10^{\frac{h_i}{10}} 10^{\frac{L_i}{10}}$$

In case that a group is switched off in the default setting of the preset, the group is discarded when computing the reference loudness $L_{ref}$. Analogously, if a user switches off a group, that group is discarded when computing the modified loudness $L_{mod}$. If a group is switched off in the default preset, but switched on by the user in the modified scene, the corresponding group loudness $L_i$ is excluded from the computation of the reference loudness $L_{ref}$ but included in the computation of the modified loudness $L_{mod}$ and vice versa. Note that discarding a group that is switched off can equivalently be interpreted as setting its gain ($g_i$ or $h_i$) to $-\infty$. In this case $M_{ref} = M_{mod}$. Hence, both loudness $L_{ref}$ and $L_{mod}$ are calculated referring to the same sets of groups.

The loudness compensation gain C is obtain from relating the reference loudness $L_{ref}$ of the preset to the modified loudness $L_{mod}$ of the preset:

$$C = 10 \log_{10} \frac{10^{\frac{L_{ref}}{10}}}{10^{\frac{L_{mod}}{10}}} = 10 \log_{10} \frac{\sum_{i=0}^{M-1} 10^{\frac{g_i + L_i}{10}}}{\sum_{i=0}^{M-1} 10^{\frac{h_i + L_i}{10}}}$$

The loudness compensation gain C is limited in one embodiment within a range of allowed gains to avoid any undesired behavior for extreme cases:

$$C_{lim} = \begin{cases} C_{max}, & \text{if } C > C_{max} \\ C, & \text{if } C_{min} < C < C_{max} \\ C_{min}, & \text{if } C < C_{min} \end{cases}$$

The loudness normalization gain $G_N$ used for loudness normalization according to the state of art (see e.g. the EP 2 879 131 A1) is then corrected according to $$G_{corrected} = G_N + C_{lim}$$

assuring consistent loudness after gain interactivity by the user. Alternatively, the loudness normalization is done based on the original normalization gain $G_N$ and the loudness compensation is performed separately on the audio signals using the limited version of the compensation gain $C_{lim}$.

The above discussion has been based on a preset of the audio program. It should be mentioned that there are not always presets available for a program, but only a single global default scene is defined. This case is handled analogously to the preset case described above, where the set of indexes $M_{ref}$ and $M_{mod}$ refer to the groups of the default scene and its modified version, respectively.

There are situations, where it is appropriate to intentionally exclude certain groups from the loudness compensation process. For example, a certain group can be active only during a very short period of time within the program and it is completely silent for the remaining time. Due to the gating process during the loudness measurement e.g. according to ITU-R BS.1770-3—by the ITU Radiocommunication Sector (ITU-R) as one of the three sectors of the International Telecommunication Union (ITU)—, such a group can still have a significant measured loudness. This group loudness will then influence the loudness compensation gain during the entire program duration, although the group is active only during very short amount of time. On the other hand such a sparse group signal has only little contribution to the loudness measurement of the entire program/preset mix.

For example, if a user chooses to boost such a sparse group/object, the loudness compensation will lead to an attenuation of all remaining audio elements during the entire program duration. Such a behavior is undesired and the loudness compensation process should ignore that particular sparse group. Hence, the metadata contains a corresponding flag for this group to be neglected for the calculation of the loudness compensation.

In order to provide the functionality described above, information is added to the metadata included in the audio stream or audio signal that indicates whether a group should be excluded from the loudness compensation, i.e. from computing the reference and modified loudness of a preset or the global audio scene. This information is in one embodiment a simple flag for each group indicating whether it is included in the loudness compensation process or not.

Different broadcast regulations on loudness control use different approaches to define program loudness. While EBU-R128 involves measuring the loudness of the full program mix, ATSC A/85 recommends measuring only the loudness of the anchor element of a program, which is typically represented by the dialog.

Such different approaches to measuring loudness for a program are also taken into account for the loudness compensation. The anchor based loudness compensation can be immediately concluded from the loudness compensation of the full mix as discussed above.

For the anchor-based reference and the modified loudness of a preset (or the default mix of a program) only those groups are included which contribute to the program anchor. The information which group is part of the program anchor is, in an embodiment, included in the metadata of the audio stream/audio signal. The reference loudness is obtained by $$L_{ref} = 10 \log_{10} \sum_{i \in A_{ref}} 10^{\frac{g_i}{10}} 10^{\frac{L_i}{10}}$$

where $A_{ref}$ denotes the set of indexes referring to groups that are part of the anchor element of the default audio scene or preset.

Analogously, the modified loudness for anchor-based loudness compensation using the set of group indexes $A_{mod}$ (referring to groups that are part of the anchor element of the modified audio scene or preset) reads $$L_{mod} = 10 \log_{10} \sum_{i \in A_{mod}} 10^{\frac{h_i}{10}} 10^{\frac{L_i}{10}}$$

It immediately follows that the compensation gain is obtained as $$C = 10 \log_{10} \frac{\sum_{i \in A_{ref}} 10^{\frac{g_i+L_i}{10}}}{\sum_{i \in A_{mod}} 10^{\frac{h_i+L_i}{10}}}$$

The remaining steps to perform loudness compensation are not changed compared to the full program mix case (see the discussion above).

In some cases, a mixture of both loudness compensation approaches—anchor-based and based on the full program mix—are beneficial for the user experience of the loudness compensation.

In an embodiment, the anchor-based approach is used for the case that one or all of the anchor groups are amplified by the user, i.e. $h_i > g_i$. On the other hand, if the anchor groups are attenuated, the loudness compensation with respect to the loudness of the full mix is used, i.e. for the case that $h_i < g_i$. The information about the anchor groups is comprised by the metadata.

The loudness compensation approach presented in the forgoing involves using the information on the loudness of each group within a preset or the global audio scene. In some scenarios, the loudness information may be available only for some groups and missing for others. Hence in one embodiment, missing group loudness information is calculated from the loudness of the preset (or the default audio scene) and the group loudness values that are available.

Let $L_p$ denote the measured loudness of the considered preset of the audio program, i.e. the measured joint loudness of the audio objects belonging to the respective preset. Furthermore, let B denote the set of indexes to groups for which the loudness information is available. A residual loudness $L_{res}$ of the preset is computed from the preset loudness, the available group loudness information, and the default/initial gains of these groups:

$$L_{res} = 10 \log_{10}\left(10^{\frac{L_p}{10}} - \sum_{i \in B} 10^{\frac{g_i}{10}} 10^{\frac{L_i}{10}}\right)$$

An alternative representation of the residual loudness can be obtained by considering the group loudness values that are not available and the corresponding default/initial gains:

$$L_{res} = 10 \log_{10}\left(\sum_{i \notin B} 10^{\frac{g_i}{10}} 10^{\frac{L_i}{10}}\right)$$

In practice it is a reasonable to assume that the loudness of each group for which the loudness information is missing is equal:

$L_i L_A$, for $i \notin B$

In this case, the residual loudness can be expressed as $$L_{res} = L_A + 10 \log_{10}\left(\sum_{i \notin B} 10^{\frac{g_i}{10}}\right)$$

From this, an estimate for the missing groups loudness values is immediately obtained as $$L_A = L_{res} - 10 \log_{10}\left(\sum_{i \notin B} 10^{\frac{g_i}{10}}\right)$$

The reference loudness and modified loudness that may be used for the loudness compensation can then be computed as already discussed, where any missing group loudness $L_i$ is replaced by a corresponding estimate $L_A$.

The estimation of missing group loudness information is done either at the encoder side or the decoder side of the audio coding system.

If the estimation is done at the encoder, the information on the group loudness within the transmitted metadata in the audio stream can be either measured, or an corresponding estimate as described above can be included instead. Then, the loudness compensation stage at the decoder has all loudness information that may be used and can do the processing in accordance to the case where all group loudness has been measured in advance by the encoder.

If the estimation is done at the decoder, the missing group loudness values in the metadata of the audio stream are estimated as described above, and then, the loudness compensation is based on the estimated group loudness values.

A special use case is given if no information on the loudness of any group is provided in the metadata of the audio stream. In this case, the loudness compensation has to work only based on the relevant rendering information available, i.e. the default or initial gain of a group $g_i$ and its modified version $h_i$ after user interaction. This is referred to as blind loudness compensation, as no loudness information for the groups is known at the decoder. In another embodiment, the blind loudness compensation is performed even if just one group loudness is missing in the metadata.

For the compensation, the assumption is used that the loudness values of all groups within a preset are the same. In an embodiment of blind loudness compensation, the assumption is introduced that $L_i = L_A$ for all groups included in $M_{ref}$ and $M_{mod}$, respectively. By this, a rule for computing the loudness compensation gain is obtained according to $$C = 10 \log_{10} \frac{\sum_{i \in M_{ref}} 10^{\frac{g_i}{10}}}{\sum_{i \in M_{mod}} 10^{\frac{h_i}{10}}}$$

Note that the gain factor for blind loudness compensation may only use information on the group gains but no loudness related information.

In a further embodiment, the blind loudness compensation is performed in case that at least one group loudness is missing. Hence, even one missing group loudness causes the blind loudness compensation.

In this section the foregoing will be summarized:

In one embodiment, a general set of indexes is specified referring to groups that should be included for the computation of the reference loudness of a preset or the default audio scene. This set is derived from information in the metadata of the audio stream whether a group should be included for performing loudness compensation for the default audio scene or a preset. This information is usually introduced in the metadata of the audio stream at the encoder.

At the encoder, the loudness compensation process is controlled by appropriately defining these bitstream elements. For example, if a certain group should be excluded, the corresponding bitstream element is set to "false". Anchor-based loudness compensation is realized in one embodiment by including only groups that are part of the anchor element of the default audio scene or of a defined preset, and setting the corresponding bitstream elements to "true". Other ways to provide this information can be used in different implementations.

As already mentioned in one embodiment, groups are discarded for computing the reference loudness $L_{ref}$ if they are switched off in the default audio scene or in a preset. The resulting set of indexes is denoted as $K_{ref}$.

Analogously, any group that is switched off in the modified scene is excluded from computing the modified loudness $L_{mod}$. If a group is switched off in the default scene, but switched on by the user in the modified scene, the corresponding group loudness is excluded from the computation of the reference loudness $L_{ref}$ but included in the computation of the modified loudness $L_{mod}$ and vice versa. The set of group indexes for the modified loudness $L_{mod}$ is denoted with $K_{mod}$.

The loudness compensation gain is then computed analogously to the discussion above by replacing $M_{ref}$ by $K_{ref}$ and by replacing $M_{mod}$ by $K_{mod}$.

For the case that any of the group loudness information that may be used to compute either the reference or the modified loudness is missing at the decoder, the blind loudness compensation is used as a fallback mode. The same approach with respect to selecting group indexes for the loudness compensation ($K_{ref}$ and $K_{mod}$) as described above is applied in the fallback mode.

Figure 3:
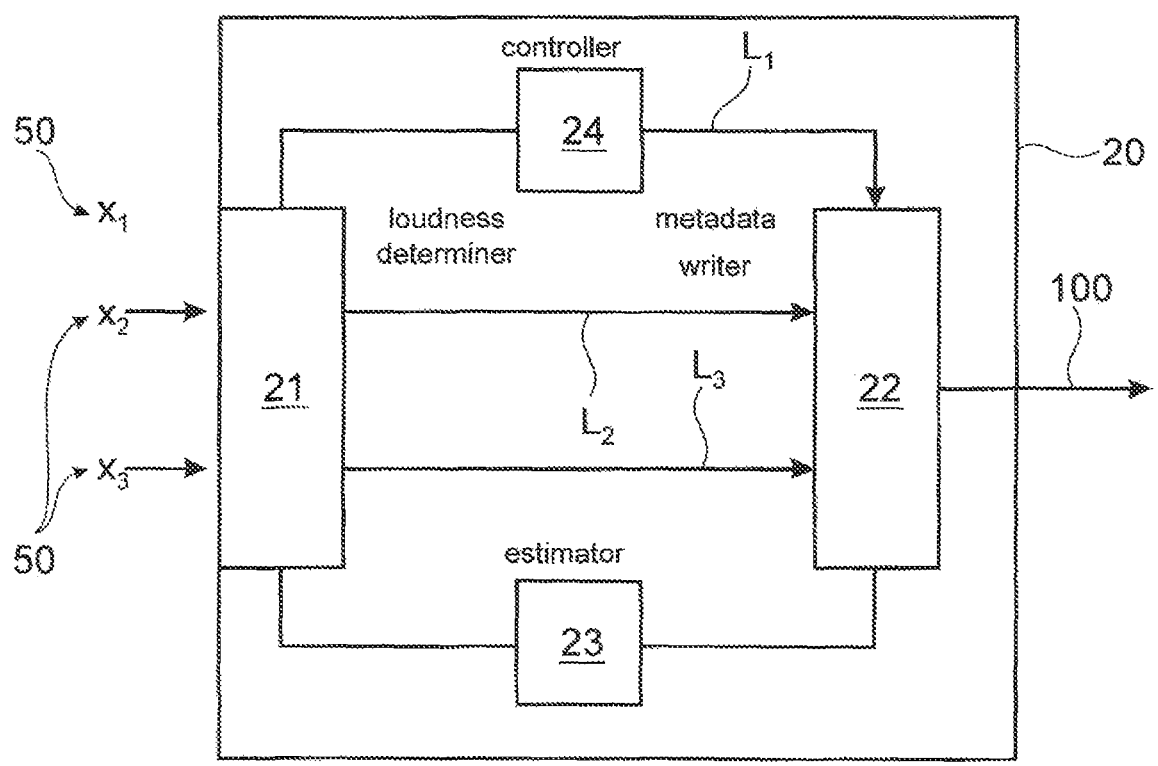

FIG. 3 shows an embodiment of an audio encoder 20 which generates a digital audio signal 100 based on different audio sources. The audio signal 100 comprises metadata to be used e.g. by the audio processor discussed above.

The audio encoder 20 comprises a loudness determiner 21 for determining a loudness value for at least one group having one or more audio elements 50. In the shown example, three audio sources $X_1$, $X_2$, and $X_3$ are present each comprised by one group. The loudness values of two of them $X_2$ and $X_3$ are determined as $L_2$ and $L_3$ and are submitted to a metadata writer 22. The metadata writer 22 introduces the determined loudness values for the two groups $X_2$ and $X_3$ as corresponding group reference loudness information $L_2$ and $L_3$ into the metadata of the audio signal 100.

Gain values as reference gains $g_1$, $g_2$, $g_3$ for the groups $X_1$, $X_2$, and $X_3$ are also inserted by the metadata writer 22 into the metadata of the audio signal 100. According to a further embodiment, the group loudnesses and reference gain values are determined for specific presets and/or different playback configurations. Also, the loudness for different presets as a respective loudness overall $L_p$ is measured.

The loudness of the first audio element 50, labelled as $X_1$ is not measured by the loudness determiner 21 but is calculated or estimated by the estimator 24 (see the discussion above) and is given as a corresponding reference loudness $L_1$ to the metadata writer 22 to be written into the metadata.

The controller 23 in the shown embodiment is connected to the loudness determiner 21 as well as to the metadata writer 22. The controller 23 determines which group or which groups are to be considered or to be neglected for the determination of the loudness compensation gain C. For the data about the usage of the groups an indication is written by the metadata writer 22 into the metadata. The corresponding data, e.g. in the form of flags, indicates which group is to be used or which group is to be neglected for the determination of the loudness compensation gain C by the audio processor or by a decoder.

The resulting audio signal 100 comprises the actual signals received from the audio objects 50 and the metadata characterizing the actual signals and their intended treatment by the audio decoder 1. The data of the metadata refers to groups of audio objects, whereas it is also possible that a group covers just one audio object/element.

The metadata contains at least some of the following data:
  measured loudness values $L_i$ for the individual groups,
  reference gain values $g_i$ for the individual groups which describe the loudness or prominence of the groups in relation to the other concerned groups together,
  a reference loudness $L_{ref}$ as the resulting loudness of the combined groups for a given preset and/or a given playback configuration,
  an indicator whether (e.g. whether the group belongs to an anchor or whether the duration of the group is so short that it can be neglected etc.) or how (e.g. for the calculation of the reference and/or modified loudness) a group or its corresponding values are used for determining the loudness compensation gain C.

For each group, the metadata advantageously contains different sets of data for different presets and/or different playback configurations. Hence, different recording and different reproduction situations are considered leading to different data sets for the relevant groups.

The invention is in the following explained via different examples for implementing loudness compensation for user interactivity with an audio coding system.
  At the encoder side, the loudness of each group included in the default audio scene and/or presets is determined. The loudness information is introduced in the metadata comprised as a part by the audio stream or the audio signal.
  Multiple loudness values are included for at least one group, where different values are associated with different loudspeaker playback configurations (e.g. stereo, 5.1 or others).
  On the encoder side, additional metadata is created that corresponds to the information whether a group should be included for performing loudness compensation, i.e. whether it should be considered for the computation of the reference loudness and the modified loudness, respectively. For example, anchor-based loudness compensation is realized by configuring the metadata to include only groups that are part of the anchor element of the default audio scene or of a defined preset.
  The decoder receives that audio stream, representing the audio signal and associated metadata. The decoder decodes the audio stream to generate decoded audio signals corresponding to channels and/or objects and/or Higher-Order Ambisonics formats.
  Based on the metadata, the decoder selects all group indexes that should be included for the loudness compensation for a given audio scene or preset.
  At the decoder, the reference loudness $L_{ref}$ of the audio scene or a preset is computed based on the default gains $g_i$ of each selected group and the corresponding loudness information. If multiple loudness values are transmitted for a group, the loudness value associated with the given playback loudspeaker configuration is chosen.

Analogously, the modified loudness $L_{mod}$ is computed from the loudness information of the selected groups and the modified gains $h_i$ after user interaction.

The loudness compensation gain C for the default audio scene or a preset is computed based on the reference loudness $L_{ref}$ and the modified loudness $L_{mod}$.

The loudness compensation gain C is applied to the audio signal before playback providing the output signal.

In some embodiments, it is not feasible to measure the loudness information that may be used for all groups at the encoder. Then, the encoder computes estimates of the missing group loudness values. The encoder may also apply different methods to estimate missing (not measured) group loudness information. The loudness compensation at the decoder is then performed as in the case that the loudness information has been measured for all groups.

In further embodiments, the audio stream includes loudness information only for a limited number of groups. In this case, the missing group loudness information is estimated at the decoder. The loudness compensation at the decoder is then performed as in the case that all loudness information that may be used has been included in the metadata of the audio stream.

Another embodiment includes the blind loudness compensation as a fallback mode if any group loudness information that may be used is missing at the decoder to perform correct loudness compensation. The same mechanism for determining the set of indexes $K_{ref}$ and $K_{mod}$ for selecting the groups to be included in the computation of the reference and modified loudness as described above is used in the fallback mode. In other words, the selection of the set of group indexes $K_{ref}$ and $K_{mod}$ is still based on the corresponding information generated at the encoder side, which is provided with the metadata of the audio stream.

Some embodiments of the invention will follow that can be combined with the foregoing:

A first embodiment refers to an audio processor for processing an audio signal, comprising: an audio signal modifier for modifying the audio signal in response to a user input; a loudness controller for determining a loudness compensation gain based on a reference loudness or a reference gain and a modified loudness or a modified gain, where the modified loudness or the modified gain depends on the user input; and a loudness manipulator for manipulating a loudness of a signal using the loudness compensation gain.

A second embodiment depending on the first embodiment refers to an apparatus, wherein the audio signal comprises a bitstream with metadata, the metadata comprising a group loudness for a group and a gain value for a group.

A third embodiment depending on the first or second embodiment refers to an apparatus, wherein the loudness controller is configured to calculate the reference loudness for a group or a set of groups using the group loudness or the group loudnesses and the gain value or the gain values for the group or the set of groups, and to calculate the modified loudness for a group or a set of groups using the group loudness or the group loudnesses and the modified gain value or the modified gain values for the group or the set of groups, wherein the modified gain value or the modified gain values are modified by the user input.

A fourth embodiment depending on one of the preceding embodiments refers to an apparatus, wherein the loudness controller is configured to discard a group for determining the reference loudness when the group is discarded in metadata of the audio signal, or wherein the loudness controller is configured to discard a group when determining the reference loudness, when the group is switched off in response to the user input, or wherein the loudness controller is configured to exclude a group from the computation of the reference loudness, when the group is switched off in the metadata and is switched on by the user input, or vice versa.

A fifth embodiment depending on one of the preceding embodiments refers to an apparatus, wherein the loudness controller is configured to calculate the loudness compensation gain by relating the reference loudness to the loudness of a preset, wherein the preset comprises one or more groups, and wherein a group comprises one or more objects.

A sixth embodiment depending on one of the preceding embodiments refers to an apparatus, wherein the loudness controller is configured to perform a limitation operation on the loudness compensation gain so that the loudness compensation gain is lower than an upper threshold or so that the loudness compensation gain is greater than a lower threshold.

A seventh embodiment depending on one of the preceding embodiments refers to an apparatus, wherein the loudness manipulator is configured to apply a gain to the signal determined by the loudness compensation gain and by an original normalization gain determined by a target level set by the audio processor and a metadata level indicated in the metadata of the audio signal.

An eighth embodiment depending on one of the preceding embodiments refers to an apparatus, wherein the audio signal comprises a compensation metadata information indicating which group is to be used for the determination of the loudness compensation gain or which group is not to be used for determining the loudness compensation gain, and wherein the loudness controller is configured to only use a group for determining the loudness compensation gain indicated to be used by the compensation metadata information or to not use a group for determining the loudness compensation gain indicated not to be used by the compensation metadata information.

A ninth embodiment depending on one of the preceding embodiments refers to an apparatus, wherein the audio signal is indicated to have an anchor element, wherein the loudness controller is configured to only use information for an audio object or a group of audio objects of the anchor element for determining the loudness compensation gain.

A tenth embodiment depending on one of the first to eighth embodiment refers to an apparatus, wherein the audio signal is indicated to have an anchor element, wherein the loudness controller is configured to only use the information for an audio object or a group of audio objects of the anchor element for determining the loudness compensation gain, when the one or more audio objects of the anchor element are amplified by the user input and to use information from one or more audio objects of the anchor element and information of one or more audio objects not included in the anchor element, when the one or more audio objects of the anchor element are attenuated by the user input.

An eleventh embodiment depending on one of the preceding embodiments refers to an apparatus, wherein the loudness controller is configured to calculate a group loudness missing in the audio signal using a loudness of a preset comprising at least two groups and gain and loudness information not missing for the preset.

A twelfth embodiment depending on one of the preceding embodiments refers to an apparatus, wherein the loudness controller is configured to perform a blind loudness compensation using one or more gain values for one or more groups and one or more modified gain values for one or more groups.

A thirteenth embodiment depending on one of the preceding embodiments refers to an apparatus, wherein the loudness controller is configured to check, whether the audio signal comprises a reference loudness information, and if the audio signal does not comprise the reference loudness information, to perform a blind loudness compensation using one or more gain values for one or more groups and one or more modified gain values for one or more groups, or to check, whether a modified loudness information cannot be calculated and to perform a blind loudness compensation, when the modified loudness information cannot be calculated, wherein the blind loudness compensation comprises using one or more gain values for one or more groups and one or more modified gain values for or more groups.

A fourteenth embodiment depending on one of the preceding embodiments refers to an apparatus, wherein the audio signal comprises different reference loudness information values for different playback configurations, wherein the apparatus further comprises a format converter for converting a signal to a predefined playback configuration, and wherein the loudness controller is configured to select the specific loudness value for the specific playback configuration used by the format converter.

A fifteenth embodiment refers to an audio encoder for generating an audio signal comprising metadata, comprising: a loudness determiner for determining a loudness for a group having one or more audio object; and a metadata writer for introducing the loudness for the group as a reference loudness information into the metadata.

A sixteenth embodiment depending on the fifteenth embodiment refers to an audio encoder, wherein the loudness determiner is configured to determine different loudness values for different playback configurations, and wherein the metadata writer is configured to introduce the different loudness values in association with the different playback configurations into the metadata.

A seventeenth embodiment depending on the fifteenth or sixteenth embodiment refers to an audio encoder, further comprising a controller for determining, which group is to be used for a loudness compensation or not, and wherein the metadata writer is configured for writing an indication into the metadata indicating, which group is to be used or which group is not to be used for the loudness compensation.

A eighteenth embodiment depending on one of the fifteenth to seventeenth embodiment refers to an audio encoder, wherein the loudness determiner is configured to compute a group loudness value for a group, where the group loudness value for the group is missing in the metadata, and wherein the metadata writer is configured for introducing the missing loudness value into the metadata so that all groups of the audio signal have associated reference loudness information.

A nineteenth embodiment refers to a method for processing an audio signal, comprising: modifying the audio signal in response to a user input; determining a loudness compensation gain based on a reference loudness or a reference gain and a modified loudness or a modified gain, where the modified loudness or the modified gain depends on the user input; and manipulating a loudness of a signal using the loudness compensation gain.

A twentieth embodiment refers to a method for generating an audio signal comprising metadata, comprising: determining a loudness for a group having one or more audio object; and introducing the loudness for the group as a reference loudness information into the metadata.

A twenty-first embodiment refers to a computer program for performing, when running on a computer or a processor, the method according to the nineteenth embodiment or the method according to the twentieth embodiment.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, some one or more of the most important method steps may be executed by such an apparatus.

The inventive transmitted or encoded signal can be stored on a digital storage medium or can be transmitted on a transmission medium such as a wireless transmission medium or a wired transmission medium such as the Internet.

Depending on certain implementation requirements, embodiments of the invention can be implemented in hardware or in software. The implementation can be performed using a digital storage medium, for example a floppy disc, a DVD, a Blu-Ray, a CD, a ROM, a PROM, and EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may, for example, be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive method is, therefore, a data carrier (or a non-transitory storage medium such as a digital storage medium, or a computer-readable medium) comprising, recorded thereon, the computer program for performing one of the methods described herein. The data carrier, the digital storage medium or the recorded medium are typically tangible and/or non-transitory.

A further embodiment of the invention method is, therefore, a data stream or a sequence of signals representing the computer program for performing one of the methods described herein. The data stream or the sequence of signals may, for example, be configured to be transferred via a data communication connection, for example, via the internet.

A further embodiment comprises a processing means, for example, a computer or a programmable logic device, configured to, or adapted to, perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example, a field programmable gate array) may be used to perform some or all of the functionalities of the methods described herein. In some embodiments, a field programmable gate array may cooperate with a microprocessor in order to perform one of the methods described herein. Generally, the methods are advantageously performed by any hardware apparatus.

In one embodiment, an audio processor (1) for processing an audio signal (100) includes an audio signal modifier (2). The audio signal modifier (2) is configured to modify the audio signal (100) in response to a user input. The audio processor further includes a loudness controller. The loudness controller (6) is configured to determine a loudness compensation gain (C) based on the one hand on a reference loudness ($L_{ref}$) or a reference gain ($g_i$) and on the other hand on a modified loudness ($L_{mod}$) or a modified gain ($h_i$). The modified loudness ($L_{mod}$) or the modified gain ($h_i$) depends on the user input. The loudness controller (6) is configured to determine the loudness compensation gain (C) based on metadata of the audio signal (100) indicating which group is to be used or is not to be used for determining the loudness compensation gain (C). The group comprises one or more audio elements. The audio signal modifier further includes a loudness manipulator (5). The loudness manipulator (5) is configured to manipulate a loudness of a signal using the loudness compensation gain (C). In one alternative, the loudness controller (6) is configured to determine the loudness compensation gain (C) based on at least one flag comprised by the data of the metadata, and the flag is indicating whether or how a group is to be considered for determining the loudness compensation gain (C). In another alternative, the loudness controller (6) is configured to use only groups for determining the loudness compensation gain (C) when the groups belong to an anchor comprised by the metadata of the audio signal (100). In another alternative, the loudness controller (6) is configured to use only the groups belonging to the anchor for determining the loudness compensation gain (C) when the modified gain ($h_i$) of at least one group belonging to the anchor is greater than the corresponding reference gain ($g_i$), and/or the loudness controller (6) is configured to use groups belonging to the anchor and groups missing from the anchor for determining the loudness compensation gain (C) when the modified gain ($h_i$) of at least one group belonging to the anchor is lower than the corresponding reference gain ($g_i$), and the modified gain ($h_i$) depends on the user input.

In one embodiment, an audio processor (1) for processing an audio signal (100) includes an audio signal modifier (2). The audio signal modifier (2) is configured to modify the audio signal (100) in response to a user input. The audio processor further includes a loudness controller (6). The loudness controller (6) is configured to determine a loudness compensation gain (C) based on the one hand on a reference loudness ($L_{ref}$) or a reference gain ($g_i$) and on the other hand on a modified loudness ($L_{mod}$) or a modified gain ($h_i$). The modified loudness ($L_{mod}$) or the modified gain ($h_i$) depends on the user input. The loudness controller (6) is configured to determine the loudness compensation gain (C) based on metadata of the audio signal (100) referring to at least one preset. The preset refers to a set of at least one group comprising one or more audio elements. The audio processor further includes a loudness manipulator (5). The loudness manipulator (5) is configured to manipulate a loudness of a signal using the loudness compensation gain (C). In one alternative, the loudness controller (6) is configured to determine the loudness compensation gain (C) based on group loudnesses ($L_i$) and/or gain values ($g_i$) of the at least one group of the set referred to by the preset. In another alternative, the loudness controller (6) is configured to determine the reference loudness ($L_{ref}$) for the set referred to by the preset using the respective group loudnesses ($L_i$) and the respective gain values ($g_i$). The loudness controller (6) is configured to determine the modified loudness ($L_{mod}$) for the set referred to by the preset using the respective group loudnesses ($L_i$) and the respective modified gain values ($h_i$). The modified gain values ($h_i$) are modified by the user input. In another alternative, the loudness controller (6) is configured to determine the loudness compensation gain (C) based on the data of the metadata referring to a selected preset, and the preset is selected by the user input. In another alternative, the loudness controller (6) is configured to determine the loudness compensation gain (C) based on the data of the metadata referring to a default preset and the default preset is set prior to or independently of a user input.

In one embodiment, an audio processor (1) for processing an audio signal (100) includes an audio signal modifier (2), the audio signal modifier (2) is configured to modify the audio signal (100) in response to a user input. The audio processor further includes a loudness controller (6), the loudness controller (6) is configured to determine a loudness compensation gain (C) based on the one hand on a reference loudness ($L_{ref}$) or a reference gain ($g_i$) and on the other hand on a modified loudness ($L_{mod}$) or a modified gain ($h_i$), and the modified loudness ($L_{mod}$) or the modified gain ($h_i$) depends on the user input. The loudness controller (6) is configured to determine the loudness compensation gain (C) based on metadata of the audio signal (100) indicating whether a group is switched off or switched on. The group comprises one or more audio elements. The audio processor further includes a loudness manipulator (5), the loudness manipulator (5) is configured to manipulate a loudness of a signal using the loudness compensation gain (C). In one alternative, the loudness controller (6) is configured to discard a group for determining the modified loudness ($L_{mod}$) when the group is switched off in response to the user input. In another alternative, the loudness controller (6) is configured to discard a group for determining the reference loudness ($L_{ref}$) when the group is switched off in the metadata and to include the group for determining the modified loudness ($L_{mod}$) when the group is switched on by the user input. In another alternative, the loudness controller (6) is configured to include a group for determining the reference loudness ($L_{ref}$) when the group is switched on in the metadata and to exclude the group for determining the modified loudness ($L_{mod}$) when the group is switched off by the user input.

In one embodiment, an audio processor (1) for processing an audio signal (100) includes an audio signal modifier (2), the audio signal modifier (2) is configured to modify the audio signal (100) in response to a user input. The audio processor further includes a loudness controller (6), the loudness controller (6) is configured to determine a loudness compensation gain (C) based on the one hand on a reference loudness ($L_{ref}$) or a reference gain ($g_i$) and on the other hand on a modified loudness ($L_{mod}$) or a modified gain ($h_i$), the modified loudness ($L_{mod}$) or the modified gain ($h_i$) depends on the user input. The loudness controller (6) is configured to determine the loudness compensation gain (C) based on metadata of the audio signal (100) with at least one group loudness missing in the metadata of a group comprised by the audio signal (100). The audio processor further includes a loudness manipulator (5), the loudness manipulator (5) is configured to manipulate a loudness of a signal (101) using the loudness compensation gain (C). In another alternative, the loudness controller (6) is configured to calculate the missing group loudness ($L_A$) using a loudness of a preset ($L_p$), the reference gain ($g_i$) of the group with missing group loudness as well as the group loudnesses ($L_i$) and the reference gains ($g_i$) for the groups having a group loudness ($L_i$). In another alternative, the loudness controller (6) is configured to determine the loudness compensation gain (C) in the case that the metadata of the audio signal (100) is missing at least one group loudness for a blind loudness compensation using only at least one reference gain ($g_i$) and at least one modified gain ($h_i$). Alternatively, the loudness controller (6) is configured to determine the loudness compensation gain (C) in the case that the metadata of the audio signal (100) is void of group loudnesses for a blind loudness compensation using only at least one reference gain ($\hat{g}$ and at least one modified gain ($h_i$).

In one embodiment, an audio processor (1) for processing an audio signal (100) includes an audio signal modifier (2), the audio signal modifier (2) is configured to modify the audio signal (100) in response to a user input. The audio processor further includes a loudness controller (6), the loudness controller (6) is configured to determine a loudness compensation gain (C) based on the one hand on a reference loudness ($L_{ref}$) or a reference gain ($g_i$) and on the other hand on a modified loudness ($L_{mod}$) or a modified gain ($h_i$). The modified loudness ($L_{mod}$) or the modified gain ($h_i$) depends on the user input. The loudness controller (6) is configured to determine the loudness compensation gain (C) based on metadata of the audio signal (100) referring to a playback configuration for a reproduction of the signal (100). The audio processor further includes a loudness manipulator (5), the loudness manipulator (5) is configured to manipulate a loudness of a signal (101) using the loudness compensation gain (C). In one alternative, the loudness controller (6) is configured to determine the loudness compensation gain (C) based on the data of the metadata referring to a playback configuration and comprising associated group loudnesses ($L_i$) and/or reference gain values ($g_i$). In another alternative, the audio signal (100) comprises a bitstream with the metadata, and wherein the metadata comprises the reference gain ($g_i$) for at least one group. Alternatively, the metadata of the audio signal (100) comprises a group loudness ($L_i$) for at least one group. In another alternative, the loudness controller (6) is configured to determine the reference loudness ($L_{ref}$) for at least one group using the group loudness ($L_i$) and the gain value ($g_i$) for the group, the loudness controller (6) is configured to determine the modified loudness ($L_{mod}$) for the group using the group loudness ($L_i$) and the modified gain value ($h_i$), and the modified gain value ($h_i$) is modified by the user input. In one alternative, the loudness controller (6) is configured to determine the reference loudness ($L_{ref}$) for a plurality of groups using the respective group loudnesses (U) and gain values ($g_i$) for the groups. In another alternative, loudness controller (6) is configured to determine the modified loudness (Lmod) for a plurality of groups using the respective group loudness ($L_i$) and modified gain value ($h_i$) for the groups. Alternatively, the loudness controller (6) is configured to perform a limitation operation on the loudness compensation gain (C) so that the loudness compensation gain (C) is lower than an upper threshold ($C_{max}$) and/or so that the loudness compensation gain (C) is greater than a lower threshold ($C_{min}$). Alternatively, the loudness manipulator (5) is configured to apply a corrected gain ($G_{corrected}$) to the signal determined by the loudness compensation gain (C) and by a normalization gain ($G_N$) determined by a target loudness level set by user input and a metadata loudness level comprised by the metadata of the audio signal (100). In another embodiment, an audio encoder (20) for generating an audio signal (100) includes a loudness determiner (21) for determining a loudness value for at least one group having one or more audio elements (50). The audio encoder further includes a metadata writer (22) for introducing the determined loudness value as a group loudness ($L_i$) into the metadata. In one alternative, the loudness determiner (21) is configured to determine different loudness values and/or different gain values for different playback configurations, and wherein the metadata writer (22) is configured to introduce the determined different loudness values and/or different gain values in association with the respective playback configuration into the metadata. Alternatively, the loudness determiner (21) is configured to determine different loudness values and/or different gain values for different presets referring to sets of at least one group comprising one or more audio elements, and the metadata writer (22) is configured to introduce the determined different loudness values and/or different gain values in association with the respective preset into the metadata. In one alternative, the audio encoder further includes a controller (23), the controller (23) is configured to determine which group is to be used for determining a loudness compensation gain (C) or is to be neglected, and wherein the metadata writer (22) is configured for writing an indication into the metadata indicating which group is to be used or is to be neglected for determining the loudness compensation gain (C). In another alternative, the audio encoder further includes an estimator (24), the estimator (24) is configured to compute a group loudness value for a group, the group loudness value for the group is undetermined by the loudness determiner (21), and the metadata writer (22) is configured for introducing the computed group loudness value into the metadata so that all groups of the audio signal (100) have associated group loudnesses.

In one embodiment, a method for processing an audio signal (100) includes modifying the audio signal (100) in response to a user input. The method further includes determining a loudness compensation gain (C) based on the one hand on a reference loudness ($L_{ref}$) or a reference gain ($g_i$) and on the other hand on a modified loudness ($L_{mod}$) or a modified gain ($h_i$), where the modified loudness ($L_{mod}$) or the modified gain ($h_i$) depends on the user input. The loudness compensation gain (C) is determined based on metadata of the audio signal (100) indicating whether a group comprised by the audio signal (100) is to be used or is not to be used for determining the loudness compensation gain (C), wherein the group comprises one or more audio elements. And/or the loudness compensation gain (C) is determined based on metadata of the audio signal (100) referring to a preset, wherein the preset refers to a set of at least one group comprising one or more audio elements. And/or the loudness compensation gain (C) is determined based on metadata of the audio signal (100) indicating whether a group is switched off or switched on, wherein the group comprises one or more audio elements. And/or the loudness compensation gain (C) is determined based on metadata of the audio signal (100) with at least one group loudness ($L_A$) missing in the metadata of a group comprised by the audio signal (100). And/or the loudness compensation gain (C) is determined based on metadata of the audio signal (100) referring to a playback configuration for a reproduction of the signal (100). The method further includes manipulating a loudness of a signal using the loudness compensation gain (C). In one alternative, a method for generating an audio signal (100) comprising metadata includes determining a loudness value for a group having one or more audio elements; and introducing the determined loudness value for the group as a group loudness ($L_i$) into the metadata. In all cases herein, the various alternatives may be implemented in the various embodiments, and the embodiments described herein are not strictly limited by these descriptions.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. Audio processor for processing an audio signal comprising metadata, the audio processor comprising:
   an audio signal modifier, wherein the audio signal modifier is configured to modify the audio signal in response to a user input via amplifying or attenuating a group comprising one or more audio elements belonging to the audio signal and according to a selected or a default preset covered by the metadata;
   a loudness controller, wherein the loudness controller is configured to determine a loudness compensation gain based on the one hand on a reference loudness or a reference gain corresponding to an original audio scene and on the other hand on a modified loudness or a modified gain, wherein the modified loudness or the modified gain depends on the user input,
   wherein the audio processor is configured to compute a loudness normalization gain based on transmitted loudness information included in the metadata and a target loudness level set by the user input, and
   a loudness manipulator, wherein the loudness manipulator is configured to manipulate a loudness of a signal using the loudness compensation gain,
   wherein the loudness manipulator is configured to apply the loudness compensation gain together with the loudness normalization gain to the signal,
   wherein the loudness controller is configured to determine the loudness compensation gain based on the metadata of the audio signal indicating which group is to be used for determining the loudness compensation gain, or indicating which group is not to be used for determining the loudness compensation gain, and wherein a group comprises one or more audio elements, or
   wherein the loudness controller is configured to determine the loudness compensation gain based on the metadata of the audio signal referring to at least one preset, wherein the preset refers to a set of at least one group comprising one or more audio elements, or
   wherein the loudness controller is configured to determine the loudness compensation gain based on the metadata of the audio signal indicating whether a group is switched off or switched on, wherein the group comprises one or more audio elements, or
   wherein the loudness controller is configured to determine the loudness compensation gain based on the metadata of the audio signal with at least one group loudness missing in the metadata of a group comprising one or more audio elements comprised by the audio signal, or
   wherein the loudness controller is configured to determine the loudness compensation gain based on the metadata of the audio signal referring to a playback configuration for a reproduction of the signal.

2. Audio processor of claim 1,
   wherein the loudness controller is configured to determine the loudness compensation gain based on the metadata of the audio signal indicating which group is to be used for determining the loudness compensation gain, or indicating which group is not to be used for determining the loudness compensation gain, and wherein the group comprises one or more audio elements,
   wherein the loudness controller is configured to determine the loudness compensation gain based on at least one flag comprised by the metadata, and
wherein the flag is indicating whether the group is to be considered for determining the loudness compensation gain.

3. Audio processor of claim 1, wherein the loudness controller is configured to determine the loudness compensation gain based on the metadata of the audio signal indicating which group is to be used for determining the loudness compensation gain, or indicating which group is not to be used for determining the loudness compensation gain, and wherein the group comprises one or more audio elements,
   wherein the loudness controller is configured to use only groups for determining the loudness compensation gain when the groups belong to an anchor comprised by the metadata of the audio signal.

4. Audio processor of claim 3, wherein the loudness controller is configured to use only the groups belonging to the anchor for determining the loudness compensation gain when the modified gain of at least one group belonging to the anchor is greater than the corresponding reference gain, and/or
   wherein the loudness controller is configured to use groups belonging to the anchor and groups missing from the anchor for determining the loudness compensation gain when the modified gain of at least one group belonging to the anchor is lower than the corresponding reference gain, and wherein the modified gain depends on the user input.

5. Audio processor of claim 1, wherein the loudness controller is configured to determine the loudness compensation gain based on the metadata of the audio signal referring to at least one preset, wherein the preset refers to a set of at least one group comprising one or more audio elements,
   wherein the loudness controller is configured to determine the loudness compensation gain based on group loudnesses and/or the reference gains of the at least one group of the set referred to by the preset.

6. Audio processor of claim 1, wherein the loudness controller is configured to determine the loudness compensation gain based on the metadata of the audio signal referring to at least one preset, wherein the preset refers to a set of at least one group comprising one or more audio elements,
   wherein the loudness controller is configured to determine the reference loudness for the set referred to by the preset using the respective group loudnesses and the respective reference gains,
wherein the loudness controller is configured to determine the modified loudness for the set referred to by the preset using the respective group loudnesses and the respective modified gains, and
wherein the modified gains are modified by the user input.

7. Audio processor of claim 1, wherein the loudness controller is configured to determine the loudness compensation gain based on the metadata of the audio signal referring to at least one preset, wherein the preset refers to a set of at least one group comprising one or more audio elements,
   wherein the loudness controller is configured to determine the loudness compensation gain based on the metadata referring to a selected preset, and
wherein the preset is selected by the user input.

8. Audio processor of any of claim 1, wherein the loudness controller is configured to determine the loudness compensation gain based on the metadata of the audio signal referring to at least one preset, wherein the preset refers to a set of at least one group comprising one or more audio elements,
   wherein the loudness controller is configured to determine the loudness compensation gain based on the metadata referring to a default preset and
wherein the default preset is set prior to or independently of the user input.

9. Audio processor of claim 1, wherein the loudness controller is configured to determine the loudness compensation gain based on the metadata of the audio signal indicating whether a group is switched off or switched on, wherein the group comprises one or more audio elements,
   wherein the loudness controller is configured to discard a group for determining the modified loudness when the group is switched off in response to the user input.

10. Audio processor of claim 1, wherein the loudness controller is configured to determine the loudness compensation gain based on the metadata of the audio signal indicating whether a group is switched off or switched on, wherein the group comprises one or more audio elements,
wherein the loudness controller is configured to discard a group for determining the reference loudness when the group is switched off in the metadata and to include the group for determining the modified loudness when the group is switched on by the user input, and/or
wherein the loudness controller is configured to include a group for determining the reference loudness when the group is switched on in the metadata and to exclude the group for determining the modified loudness when the group is switched off by the user input.

11. Audio processor of claim 1, wherein the loudness controller is configured to determine the loudness compensation gain based on the metadata of the audio signal with at least one group loudness missing in the metadata of a group comprised by the audio signal; and
wherein the loudness controller is configured to calculate the missing group loudness using a loudness of the preset, the reference gain of the group with missing group loudness as well as the group loudnesses and the reference gains for the groups having a group loudness.

12. Audio processor of claim 1, wherein the loudness controller is configured to determine the loudness compensation gain based on the metadata of the audio signal with at least one group loudness missing in the metadata of a group comprised by the audio signal; and
wherein the loudness controller is configured to determine the loudness compensation gain in the case that the metadata of the audio signal is missing for at least one group loudness for a blind loudness compensation using only at least one reference gain and at least one modified gain.

13. Audio processor of claim 1, wherein the loudness controller is configured to determine the loudness compensation gain based on the metadata of the audio signal with at least one group loudness missing in the metadata of a group comprised by the audio signal; and
wherein the loudness controller is configured to determine the loudness compensation gain in the case that the metadata of the audio signal is void of group loudnesses for a blind loudness compensation using only at least one reference gain and at least one modified gain.

14. Audio processor of claim 1, wherein the loudness controller is configured to determine the loudness compensation gain based on the metadata of the audio signal referring to a playback configuration for a reproduction of the signal; and
wherein the loudness controller is configured to determine the loudness compensation gain based on the metadata referring to a playback configuration and comprising associated group loudnesses for groups each group comprising one or more audio elements and/or the reference gains.

15. Audio processor of claim 1, wherein the audio signal comprises a bitstream with the metadata, and
wherein the metadata comprises the reference gain for at least one group or a group loudness for at least one group.

16. Audio processor of claim 1, wherein the loudness controller is configured to determine the reference loudness for at least one group using the group loudness and the reference gain for the group,
wherein the loudness controller is configured to determine the modified loudness for the group using the group loudness and the modified gain, and
wherein the modified gain is modified by the user input.

17. Audio processor of claim 1, wherein the loudness controller is configured to determine the reference loudness for a plurality of groups using the respective group loudnesses and the reference gains for the groups,
wherein the loudness controller is configured to determine the modified loudness for a plurality of groups using the respective group loudness and the modified gain for the groups.

18. Audio processor of claim 1, wherein the loudness controller is configured to perform a limitation operation on the loudness compensation gain so that the loudness compensation gain is lower than an upper threshold and/or so that the loudness compensation gain is greater than a lower threshold.

19. Audio processor of claim 1,
wherein the loudness manipulator is configured to apply a corrected gain to the signal, wherein the corrected gain is determined by the loudness compensation gain and the loudness normalization gain, and wherein the loudness normalization gain is determined by the target loudness level and a metadata loudness level as the transmitted loudness information comprised by the metadata of the audio signal, or
   wherein the audio processor is configured to perform a loudness normalization based on the loudness normalization gain, and a separate loudness compensation on the signal is performed using the loudness compensation gain.

20. Audio encoder for generating an audio signal comprising metadata, comprising:
a loudness determiner configured for determining a loudness value for at least one group having one or more audio elements; and
a metadata writer configured for introducing the determined loudness value as a group loudness into the metadata and for introducing a measured loudness level of the audio signal into the metadata, wherein the group loudness is different from the measured loudness level,
further comprising a controller, wherein the controller is configured to determine that a group is to be used for determining a loudness compensation gain and another group is to be neglected for determining a loudness compensation gain, and wherein the metadata writer is configured for writing an indication into the metadata indicating the group to be used and the other group to be neglected for determining the loudness compensation gain, or
wherein the loudness determiner is configured to determine different loudness values and/or different gain values for different presets referring to sets of at least one group comprising one or more audio elements, and wherein the metadata writer is configured to introduce the determined different loudness values and/or different gain values in association with the respective preset into the metadata, or
wherein the metadata writer is configured to introduce whether a group is switched off or switched on for determining a reference loudness in a decoder, or
wherein the metadata writer is configured to introduce the determined loudness value as a group loudness into the metadata, and wherein at least one group loudness is missing in the metadata, or
wherein the loudness determiner is configured to determine different loudness values and/or different gain values for different playback configurations, and wherein the metadata writer is configured to introduce the determined different loudness values and/or different gain values in association with the respective playback configuration into the metadata.

21. Audio encoder of claim 20, wherein the loudness determiner is configured for determining a group loudness for a group but not for another group,
wherein the audio encoder further comprises an estimator, wherein the estimator is configured to compute a group loudness value for the other group based on a loudness of a preset or a default audio scene and the group loudness determined by the loudness determiner, and
wherein the metadata writer is configured for introducing the computed group loudness value into the metadata in addition to the group loudness determined by the loudness determiner, so that all groups of the audio signal have associated group loudnesses.

22. Method for processing an audio signal comprising metadata, the method comprising:
modifying the audio signal in response to a user input via amplifying or attenuating a group comprising one or more audio elements belonging to the audio signal and according to a selected or a default preset covered by the metadata;
determining a loudness compensation gain based on the one hand on a reference loudness or a reference gain and on the other hand on a modified loudness or a modified gain corresponding to an original audio scene, where the modified loudness or the modified gain depends on the user input,
wherein a loudness normalization gain is determined based on transmitted loudness information included in the metadata and a target loudness level set by the user input,
wherein the loudness compensation gain is determined based on the metadata of the audio signal indicating whether a group comprised by the audio signal is to be used for determining the loudness compensation gain, or indicating whether a group comprised by the audio is not to be used for determining the loudness compensation gain, wherein a group comprises one or more audio elements, and/or
wherein the loudness compensation gain is determined based on the metadata of the audio signal referring to a preset, wherein the preset refers to a set of at least one group comprising one or more audio elements, and/or
wherein the loudness compensation gain is determined based on the metadata of the audio signal indicating whether a group is switched off or switched on, wherein the group comprises one or more audio elements, and/or
wherein the loudness compensation gain is determined based on the metadata of the audio signal with at least one group loudness missing in the metadata of a group comprised by the audio signal, and/or
wherein the loudness compensation gain is determined based on the metadata of the audio signal referring to a playback configuration for a reproduction of the signal; and
manipulating a loudness of a signal using the loudness compensation gain wherein the loudness compensation gain is applied together with the loudness normalization gain to the signal.

23. Non-transitory storage medium having stored thereon a computer program for performing, when running on a computer or a processor, the method of claim 22.

24. Method for generating an audio signal comprising metadata, comprising:
determining a loudness value for a group having one or more audio elements; and
introducing the determined loudness value for the group as a group loudness into the metadata and introducing a measured loudness level of the audio signal into the metadata wherein the group loudness is different from the measured loudness level,
further comprising determining that a group is to be used for determining a loudness compensation gain and another group is to be neglected for determining a loudness compensation gain, and writing an indication into the metadata indicating the group to be used and the other group to be neglected for determining the loudness compensation gain, or
determining different loudness values and/or different gain values for different presets referring to sets of at least one group comprising one or more audio elements, and introducing the determined different loudness values and/or different gain values in association with the respective preset into the metadata, or
introducing into the metadata, whether a group is switched off or switched on for determining a reference loudness in a decoder, or
introducing into the metadata the determined loudness value as a group loudness into the metadata, and wherein at least one group loudness is missing in the metadata, or
determining different loudness 6/values and/or different gain values for different playback configurations, and introducing the determined different loudness values and/or different gain values in association with the respective playback configuration into the metadata.

25. Non-transitory storage medium having stored thereon a computer program for performing, when running on a computer or a processor, the method of claim 24.

* * * * *